(12) United States Patent
Amano et al.

(10) Patent No.: US 11,270,587 B2
(45) Date of Patent: Mar. 8, 2022

(54) VEHICLE ON-BOARD COMMUNICATION DEVICE AND VEHICLE

(71) Applicant: Toyota Jidosha Kabushiki Kaisha, Toyota (JP)

(72) Inventors: Megumi Amano, Toyota (JP); Kohei Maejima, Nagakute (JP); Chika Kajikawa, Toyota (JP); Hikaru Gotoh, Nagoya (JP); Yoshiaki Matsumura, Toyota (JP); Chiharu Hayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/229,537

(22) Filed: Dec. 21, 2018

(65) Prior Publication Data
US 2019/0206253 A1    Jul. 4, 2019

(30) Foreign Application Priority Data

Dec. 28, 2017   (JP) .............................. JP2017-254799

(51) Int. Cl.
*G08G 1/0967* (2006.01)
*G08G 1/16* (2006.01)
*B60W 50/14* (2020.01)

(52) U.S. Cl.
CPC ............ *G08G 1/163* (2013.01); *B60W 50/14* (2013.01); *G08G 1/096716* (2013.01);
(Continued)

(58) Field of Classification Search
CPC .. G08G 1/163; G08G 1/096716; G08G 1/162; G08G 1/096741; G08G 1/096791; G08G 1/166; G08G 1/167; G08G 1/133; B60W 50/14; B60W 2556/65; B60W 2050/146; B60Q 1/50; H04W 4/46; B60R 99/00
See application file for complete search history.

(56) References Cited

U.S. PATENT DOCUMENTS 8,612,136 B2 * 12/2013 Levine ............. G08G 1/096844
701/408
8,629,903 B2 *  1/2014 Seder ..................... G08G 1/161
348/115
(Continued)

FOREIGN PATENT DOCUMENTS

DE    102016205142 A1   10/2017
DE    102016207791 A1   11/2017
(Continued)

*Primary Examiner* — Donald J Wallace
*Assistant Examiner* — Daniel M. Robert
(74) *Attorney, Agent, or Firm* — Dinsmore & Shohl LLP

(57) ABSTRACT

A vehicle on-board communication device is provided with a communication unit that transmits and receives via wireless communication between a host vehicle and other vehicles located in the vicinity thereof intention information relating to an intention of a vehicle occupant, an instruction unit that receives transmission instructions from an occupant of the host vehicle and causes the intention information to be transmitted to the communication unit, and a notification unit that notifies the occupant of the host vehicle about the intention information of an occupant of another vehicle received by the communication unit.

18 Claims, 22 Drawing Sheets

(52) U.S. Cl.
CPC . *G08G 1/096741* (2013.01); *G08G 1/096791* (2013.01); *G08G 1/162* (2013.01); *G08G 1/166* (2013.01); *G08G 1/167* (2013.01); *B60W 2050/146* (2013.01); *B60W 2556/65* (2020.02)

(56) References Cited

U.S. PATENT DOCUMENTS

| | | | |
|---|---|---|---|
| 2004/0128062 A1 | 7/2004 | Ogino et al. | |
| 2013/0099911 A1 | 4/2013 | Mudalige et al. | |
| 2013/0281141 A1* | 10/2013 | Rubin | G08G 1/16 455/500 |
| 2014/0267398 A1* | 9/2014 | Beckwith | G08G 1/166 345/633 |
| 2017/0032402 A1* | 2/2017 | Patsiokas | G06Q 30/0261 |
| 2017/0039848 A1* | 2/2017 | Hakeem | H04M 1/7243 |
| 2019/0061529 A1* | 2/2019 | Saisho | G02B 26/10 |
| 2019/0098471 A1* | 3/2019 | Rech | G08G 1/162 |
| 2019/0164424 A1* | 5/2019 | Kleen | H04W 4/46 |

FOREIGN PATENT DOCUMENTS

| | | | |
|---|---|---|---|
| JP | 2004-118608 A | | 4/2004 |
| JP | 2005008135 A | | 1/2005 |
| JP | 2005-142647 A | | 6/2005 |
| JP | 2005-215753 A | | 8/2005 |
| JP | 2005215753 A | * | 8/2005 |
| JP | 2005234921 A | * | 9/2005 |
| JP | 2007099250 A | * | 4/2007 |
| JP | 2007099250 A | | 4/2007 |
| JP | 2010-213146 A | | 9/2010 |
| JP | 2016-170484 A | | 9/2016 |
| JP | 2016170484 A | * | 9/2016 |
| KR | 10-2010-0107800 A | | 10/2010 |

* cited by examiner

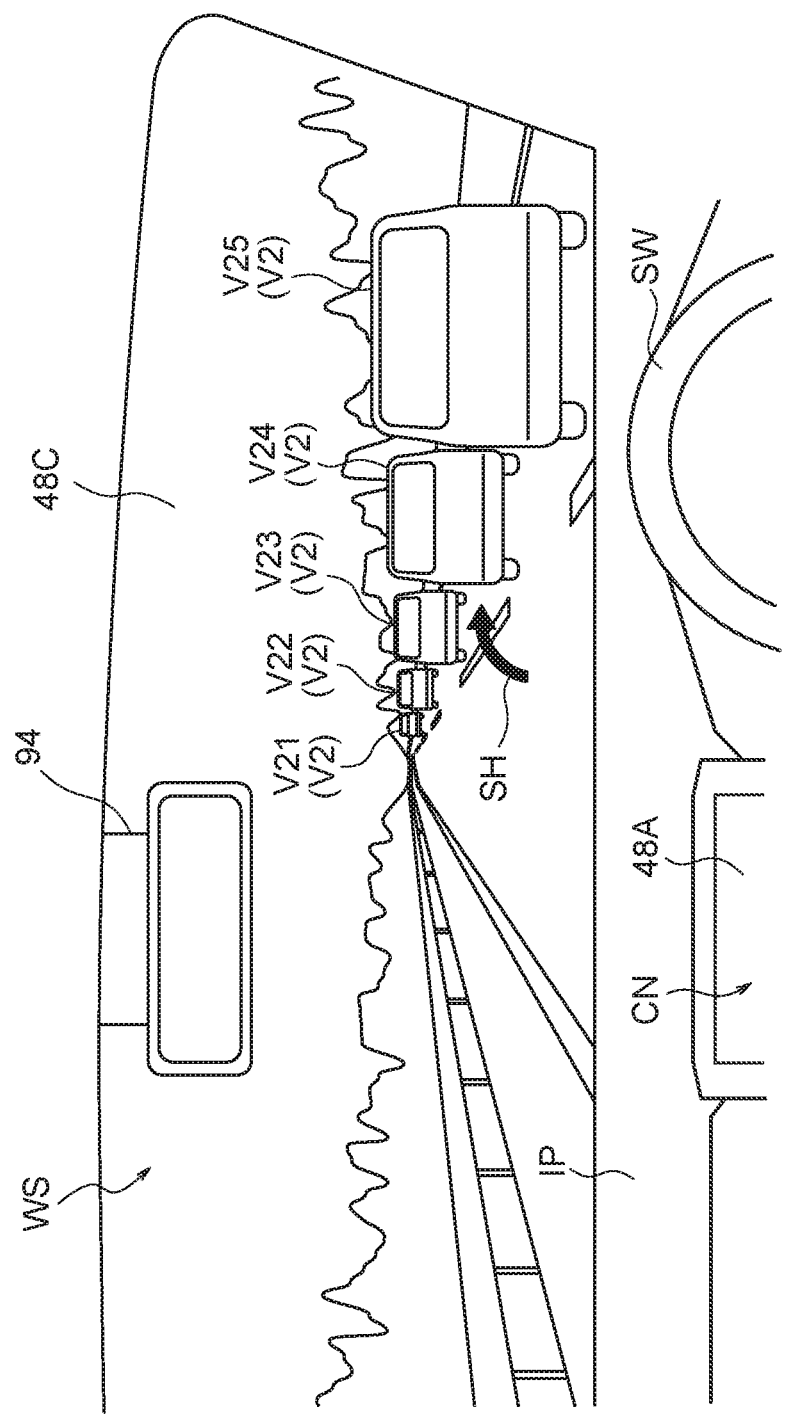

VEHICLE ON-BOARD COMMUNICATION DEVICE AND VEHICLE

CROSS-REFERENCE TO RELATED APPLICATION

This application is based on and claims priority under 35 USC 119 from Japanese Patent Application No. 2017-254799 filed on Dec. 28, 2017, the disclosure of which is incorporated by reference herein.

BACKGROUND

Technical Field

The present disclosure relates to a vehicle on-board communication device that performs wireless communication between its own host vehicle and other vehicles located in the vicinity thereof, and to a vehicle in which this vehicle on-board communication device is mounted.

Related Art

Lighting-based signals that are attached to a rear window glass of an automobile, and are used to convey a driver's intention to a following vehicle are disclosed in Japanese Unexamined Patent Application (JP-A) No. 2007-99250.

In the foregoing Prior Art, due to the running state of the vehicle or to the weather conditions or the like, there may be cases when it is difficult for an occupant of a following vehicle to visually recognize lighting-based signals from a preceding vehicle, and it may consequently be difficult for an intention of the driver of a preceding vehicle to be conveyed to a following vehicle.

SUMMARY

The present disclosure was conceived in view of the above-described circumstances, and it is an object thereof to provide a vehicle on-board communication device and a vehicle that enable an intention of a vehicle occupant to be conveyed to another vehicle irrespective of a vehicle running state or the weather conditions.

A vehicle on-board communication device of a first aspect of the present disclosure is provided with a communication unit that transmits and receives via wireless communication between a host vehicle and other vehicles located in the vicinity thereof intention information relating to an intention of a vehicle occupant, an instruction unit that receives transmission instructions from an occupant of the host vehicle and causes the intention information to be transmitted to the communication unit, and a notification unit that notifies the occupant of the host vehicle about the intention information of an occupant of another vehicle received by the communication unit.

In the vehicle on-board communication device of the first aspect of the present disclosure, when an instruction unit receives transmission instructions from an occupant of its own host vehicle, intention information for that vehicle occupant is transmitted by a communication unit to another vehicle via wireless communication. In addition, when the communication unit receives intention information from another vehicle, the vehicle occupant of the host vehicle is notified by a notification unit about the received intention information. As a result, intention information can be conveyed irrespective of a vehicle running state or the weather conditions.

A vehicle on-board communication device of a second aspect of the present disclosure is characterized in that, in the first aspect, together with the intention information, the communication unit also transmits and receives transmitting vehicle information that indicates a transmission source of the intention information, and the notification unit notifies the occupant of the host vehicle of the transmitting vehicle information received by the communication unit together with the intention information.

In the vehicle on-board communication device of the second aspect of the present disclosure, because an occupant of the host vehicle is notified about transmitting vehicle information that is transmitted and received together with intention information, it is possible to prevent any ambiguity concerning the source of an intention information transmission.

A vehicle on-board communication device of a third aspect of the present disclosure is characterized in that, in the first aspect, there is provided a lane entry control unit that, when a host vehicle wishes to perform a lane entry by moving in front of a given vehicle among plural other vehicles traveling in a line in the same traffic lane, detects whether or not permission to perform the lane entry has been given by an occupant of the given vehicle, using the intention information received by the communication unit, wherein the notification unit notifies the occupant of the host vehicle of the given vehicle from which the permission has been detected by the lane entry control unit.

According to the vehicle on-board communication device of the third aspect of the present disclosure, when the host vehicle of a lane entry control unit wishes to make a lane entry by moving in front of a given vehicle among plural other vehicles traveling in a line in the same traffic lane, the lane entry control unit detects whether or not permission to perform the lane entry has been given by an occupant of the given vehicle, using the intention information received by the communication unit. The notification unit then notifies the occupant of the host vehicle of the given vehicle from which the permission has been detected by the lane change control unit. As a consequence, it is possible to prevent or reduce any trouble arising from a lane entry.

A vehicle on-board communication device of a fourth aspect of the present disclosure is characterized in that, in the first aspect, an instruction to select one item of the intention information, from plural types of the intention information stored in the instruction unit, for transmission to the communication unit, is contained in the transmission instructions.

According to the vehicle on-board communication device of the fourth aspect of the present disclosure, when an occupant of a host vehicle of the vehicle on-board communication device transmits intention information to another vehicle, that host vehicle occupant selects one item of the intention information to be transmitted to the communication unit from plural types of intention information stored in the instruction unit. As a consequence, it is possible to reduce the burden on the occupant of the host vehicle of having to think up the contents of the intention information to be transmitted to other vehicles.

A vehicle on-board communication device of a fifth aspect of the present disclosure is characterized in that, in the first aspect, the notification unit comprises a display unit that displays the intention information of an occupant of another vehicle that has been received by the communication unit on at least one of a windshield portion of the host vehicle or an instrument panel portion of the host vehicle.

According to the vehicle on-board communication device of the fifth aspect of the present disclosure, a display unit forming part of the notification unit displays intention information received by the communication unit on at least one of a windshield portion or an instrument panel portion of its own host vehicle. As a result, an occupant of the host vehicle is able to visually confirm intention information transmitted from another vehicle.

A vehicle on-board communication device of a sixth aspect of the present disclosure is characterized in that, in the fifth aspect, further comprising a transmission source detecting unit that detects a position of another vehicle which is a transmission source of the intention information received by the communication unit, wherein, when the other vehicle detected by the transmission source detecting unit is located in front of the host vehicle, the display unit displays, on the windshield portion, the received intention information such that, when viewed from the perspective of the driver of the host vehicle, this received intention information appears either superimposed on or adjacent to the detected other vehicle.

In the vehicle on-board communication device of the sixth aspect of the present disclosure, the transmission source detecting unit detects another vehicle that is the transmission source of the intention information received by the communication unit. Additionally, when the other vehicle detected by the transmission source detecting unit is located in front of the host vehicle, the display unit displays the received intention information on the windshield portion of the host vehicle such that, when viewed from the perspective of the driver of the host vehicle, this received intention information appears either superimposed on or adjacent to the detected other vehicle. As a consequence, an occupant of the host vehicle is able to easily confirm the transmission source of the intention information.

A vehicle on-board communication device according to a seventh aspect of the present disclosure is characterized in that, in the first aspect, the instruction unit comprises a vehicle detecting unit that detects another vehicle that is both located adjacently to the host vehicle and that an occupant of the host vehicle has specified as the transmission destination of the intention information, and the communication unit transmits the intention information exclusively to the other vehicle detected by the vehicle detecting unit.

In the vehicle on-board communication device of the seventh aspect of the present disclosure, when an occupant of a host vehicle instructs the instruction unit to transmit intention information, that vehicle occupant specifies another vehicle which is the transmission destination of the intention information from among other vehicles located adjacently to the host vehicle. The specified other vehicle is then detected by the vehicle detecting unit forming part of the instruction unit, and the communication unit transmits intention information exclusively to this detected other vehicle. As a consequence, it is possible to prevent intention information being transmitted to different other vehicles than the other vehicle intended to be the intention information recipient by the occupant of the host vehicle.

A vehicle on-board communication device of an eighth aspect of the present disclosure is characterized in that, in the first aspect, an instruction as to a transmission direction of the intention information is contained in the transmission instructions, and the communication unit transmits the intention information in the transmission direction instructed with respect to the instruction unit.

According to the vehicle on-board communication device of the eighth aspect of the present disclosure, when an occupant of a host vehicle transmits intention information to another vehicle, the host vehicle occupant instructs the instruction unit as to the direction in which the intention information is to be transmitted. As a consequence, the communication unit transmits the intention information in the transmission direction instructed to the instruction unit. In this disclosure, because there is no need to detect (i.e., identify) the destination of an intention information transmission, a simpler structure can be employed compared with when the destination of an intention information transmission is detected.

A vehicle on-board communication device of a ninth aspect of the present disclosure is characterized in that, in the first aspect, the instruction unit comprises a voice acquisition unit that acquires a voice input of an occupant of the host vehicle, and receives the transmission instructions via this voice input.

According to the vehicle on-board communication device of the ninth aspect of the present disclosure, an occupant of the host vehicle is able to use their voice to instruct the instruction unit to transmit intention information.

A vehicle on-board communication device of a tenth aspect of the present disclosure is characterized in that, in the first aspect, the instruction unit comprises an image capture unit that captures images of the driver of the host vehicle, and receives the transmission instructions via a gesture made by the driver.

According to the vehicle on-board communication device of the tenth aspect of the present disclosure, the driver of the host vehicle is able to use gestures to instruct the instruction unit to transmit intention information.

A vehicle on-board communication device of an eleventh aspect of the present disclosure is characterized in that, in the first aspect, the instruction unit comprises an operating unit that is operated by an occupant of the host vehicle, and receives the transmission instructions via this operation.

According to the vehicle on-board communication device of the eleventh aspect of the present disclosure, the driver of the host vehicle is able to instruct the instruction unit to transmit intention information by operating an operating unit (for example, a switch).

A vehicle of a twelfth aspect of the present disclosure is provided with the vehicle on-board communication device of the first aspect.

Because the vehicle of the twelfth aspect of the present disclosure is provided with the vehicle on-board communication device of the first aspect, the above-described actions and effects are achieved.

As has been described above, in the vehicle on-board communication device and vehicle of the present disclosure, it is possible for an intention of a vehicle occupant to be conveyed to another vehicle irrespective of a vehicle running state or the weather conditions.

BRIEF DESCRIPTION OF THE DRAWINGS

Exemplary embodiments of the present disclosure will be described in detail based on the following figures, wherein:

FIG. 22 is a perspective view showing a situation in which an occupant of the host vehicle is notified that another vehicle that has given permission to make a lane entry has been detected.

DETAILED DESCRIPTION

First Embodiment

Hereinafter, a vehicle on-board communication device 10 and a vehicle V1 according to a first exemplary embodiment of the present disclosure will be described in detail with reference to FIG. 1 through FIG. 7. Note that, hereinafter, if simple front-rear or left-right directions are used in the following description, then, unless specifically stated otherwise, these refer respectively to the front-rear and left-right directions of the vehicle V1.

(Structure)

The vehicle on-board communication device 10 according to the present exemplary embodiment is mounted in the vehicle V1 (see FIG. 6 and FIG. 7; referred to below as the 'host vehicle V1), and is an inter-vehicle communication device that performs vehicle-to-vehicle communication between the host vehicle V1 and other vehicles V2 (see FIG. 6 and FIG. 7) that are located in the vicinity of the host vehicle V1. In this exemplary embodiment, a vehicle on-board communication device 10 is mounted in each one of the host vehicle V1 and the other vehicles V2. Note that, in FIG. 7, plural other vehicles V2 are shown in the form of other vehicles V21 through V23. This exemplary embodiment can also be considered as an exemplary embodiment of a disclosure of a vehicle on-board communication system that is formed so as to include plural vehicles in which vehicle on-board communication devices 10 have been mounted.

Figure 1:
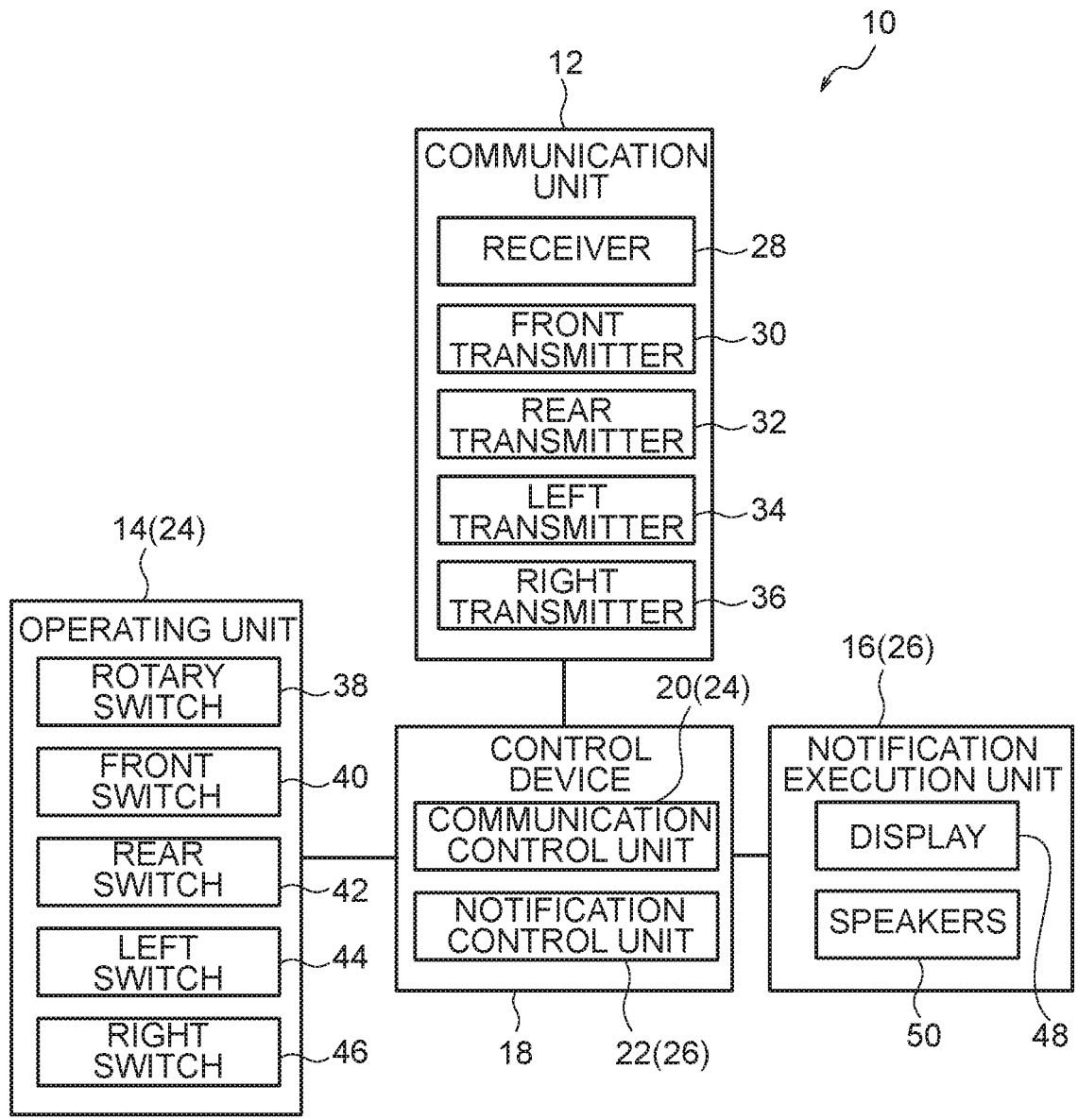
FIG. 1 is a block diagram showing the schematic structure of a vehicle on-board communication device according to a first exemplary embodiment of the present disclosure.

As is shown in FIG. 1, the vehicle on-board communication device 10 includes a communication unit 12, an operating unit 14 that serves as an instruction input unit, a notification execution unit 16, and a control device 18. The control device 18 includes a communication control unit 20 that controls the communication unit 12, and a notification control unit 22 that controls the notification execution unit 16. The operating unit 14 and the communication control unit 20 form an instruction unit 24, while the notification execution unit 16 and the notification control unit 22 form a notification unit 26.

Figure 2:
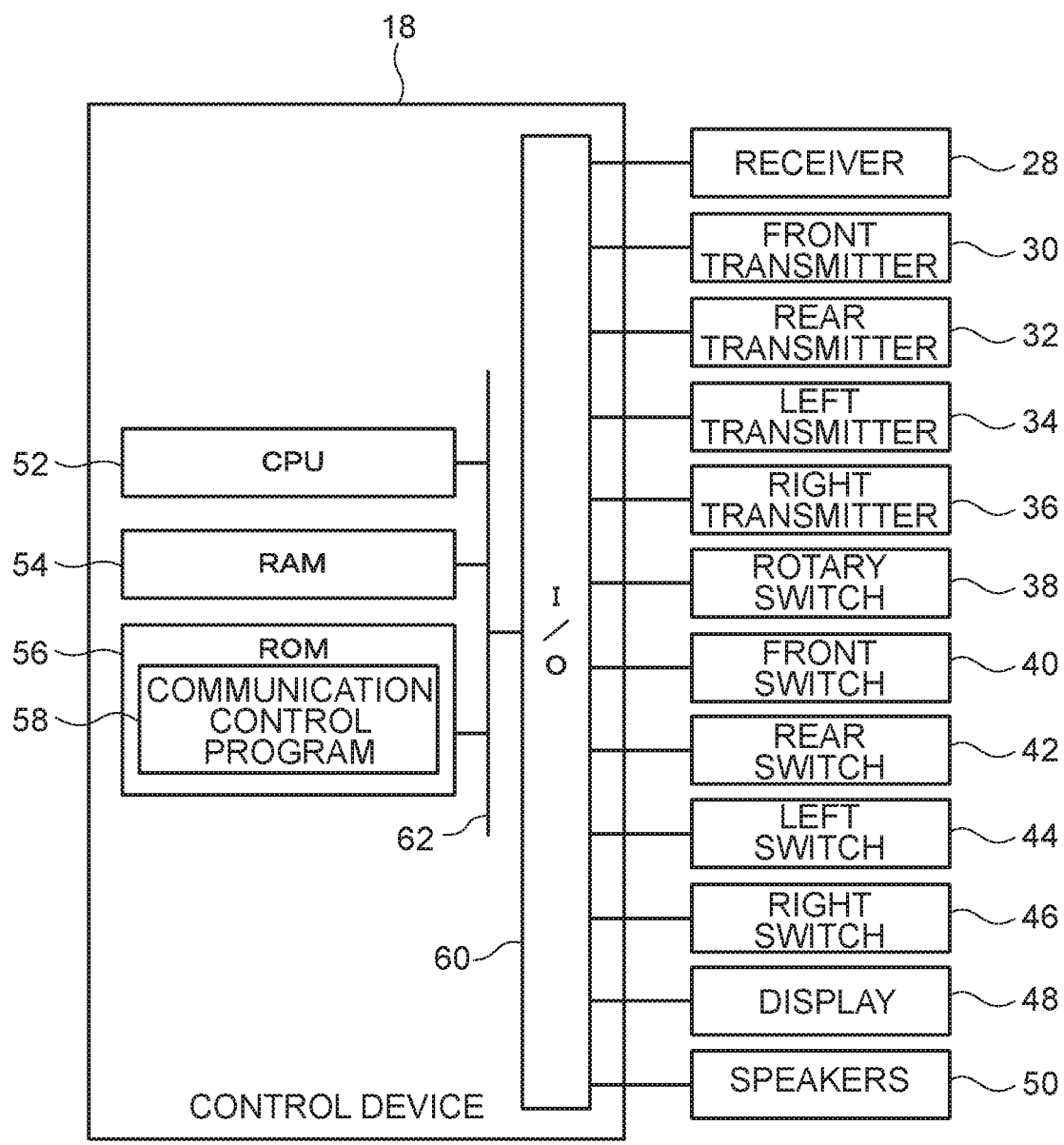
FIG. 2 is a block diagram showing an example of the schematic structure of a control device provided in the vehicle on-board communication device according to the first exemplary embodiment.

The communication unit 12 forms part of a wireless communication device that employs wireless communication to transmit and receive intention information relating to intentions of vehicle occupants between the host vehicle V1 and the other vehicles V2. As is shown in FIG. 1 and FIG. 2, this communication unit 12 includes a receiver 28, a front transmitter 30, a rear transmitter 32, a left transmitter 34, and a right transmitter 36. For example, a 700 MHz Intelligent Transport Systems Standard (ARIB STD T-109) may be employed for the format of the wireless communication between this communication unit 12 and the communication units 12 of the other vehicles V2. The front transmitter 30, rear transmitter 32, left transmitter 34, and right transmitter 36 are formed so as to transmit data only in a specific direction via, for example, multi-hop broadcasting. More specifically, the front transmitter 30 only transmits data towards the front side of the host vehicle V1, the rear transmitter 32 only transmits data towards the rear side of the host vehicle V1, the left transmitter 34 only transmits data towards the left side of the host vehicle V1, and the right transmitter 36 only transmits data towards the right side of the host vehicle V1.

Figure 3:
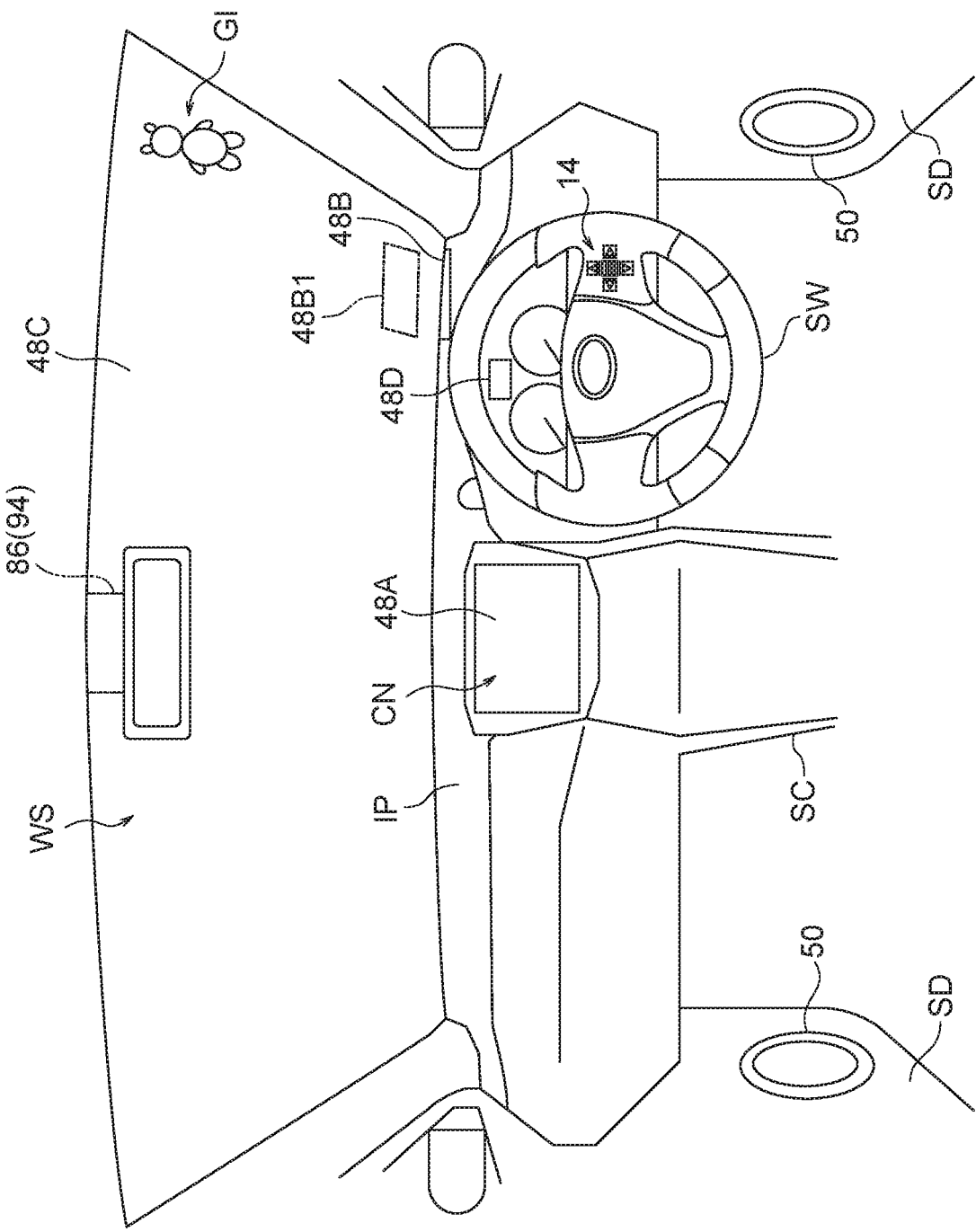
FIG. 3 is a perspective view showing the structure of a vehicle cabin front portion according to the first exemplary embodiment.
Figure 4:
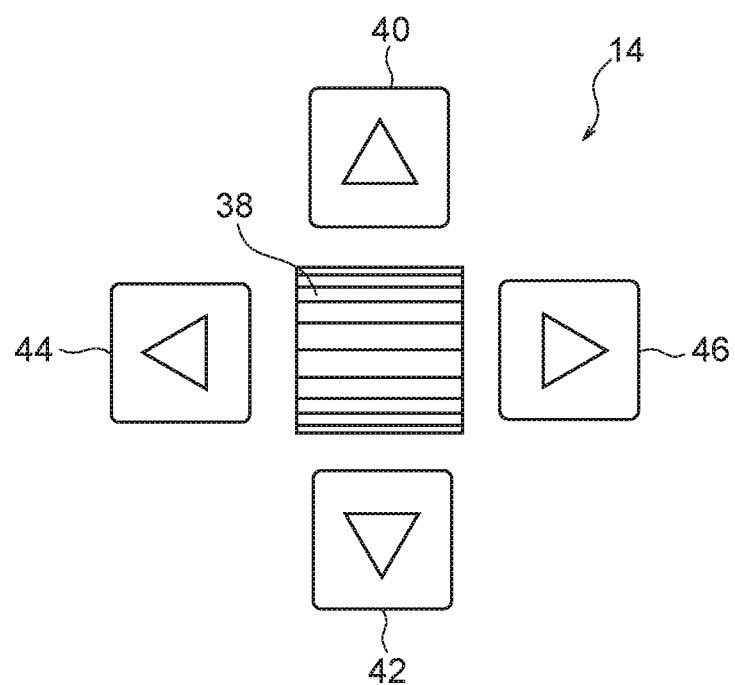
FIG. 4 is a front view showing the structure of an operating unit provided in the vehicle on-board communication device according to the first exemplary embodiment.

The operating unit 14 forms an input unit of an HMI (Human Machine Interface) provided in the vehicle on-board communication device 10. As is shown in FIG. 3, this operating unit 14 is provided in a steering wheel portion SW of the host vehicle V1, and as is shown in FIG. 4, includes a rotary switch 38, a front switch 40, a rear switch 42, a left switch 44, and a right switch 46. The rotary switch 38 is capable, for example, of performing a rotation action in an up-down direction. The front switch 40, rear switch 42, left switch 44, and right switch 46 are formed by push-button switches, and are disposed so as to surround the rotary switch 38 from the up, down, left, and right directions. Note that an illustration of the steering wheel portion SW has been omitted from FIG. 4.

These switches, 38, 40, 42, 44, and 46 are able to be operated by the right-hand thumb or the like of an occupant (not shown in the drawing; in this case, the driver) of the host vehicle V1. Note that the location where the operating unit 14 is placed is not limited to the steering wheel portion SW, and may be any location where the operating unit 14 is easily operated by an occupant of the host vehicle V1 (for example, on a center console portion SC shown in FIG. 3). Moreover, instead of being hard keys such as each of the above-described switches, it is also possible for the operating unit 14 to be formed by soft keys that are displayed on a center display (i.e., a touch panel) 48A or the like (described below).

The notification execution unit 16 forms an output portion of the HMI provided in the vehicle on-board communication device 10, and includes the display 48 as a display unit, and speakers 50 as an audio output unit. The display 48 is formed so as to include at least one of the center display 48A, a head-up display 48B, a transparent display 48C, or a multi-information display 48D. The center display 48A is provided in a car navigation device CN that is disposed in a central portion in a vehicle width direction in an instrument panel IP of the host vehicle V1. The center display 48A displays images from a navigation system belonging to this car navigation device CN or from an entertainment system or the like. This center display 48A forms, for example, an electrostatic capacity type touch panel.

The head-up display 48B is provided, for example, above the instrument panel IP in front of a driver' seat (not shown in the drawings) of the host vehicle V1. The head-up display 48B projects image displays onto a display area 48B1 set in a windshield portion (i.e., the front windshield glass) WS of the host vehicle V1. This head-up display 48B includes, for example, a light source, a liquid crystal panel that transmits light emitted from the light source, and reflectors that reflect the light transmitted through the liquid crystal panel onto the display area 48B1. This head-up display 48B is capable of displaying, for example, the aforementioned images from the navigation system and the like in the display area 48B1.

The transparent display 48C is formed, for example, by a transparent liquid crystal panel, and is formed integrally with the windshield portion WS. In addition to the aforementioned images from the navigation system and entertainment system, the transparent display 48C is also capable of displaying information used to facilitate driving in an optional location on the windshield portion WS. The multi-information display 48D is provided adjacent to the various instrument gauges such as the speedometer (no symbol is given for this in the drawings) and the like in front of the driver' seat in the instrument panel IP, and displays an odometer, a trip meter, the outside temperature, and fuel information and the like. The speakers 50 are provided respectively in left and right side doors SD of the host vehicle V1, and serve as audio output units for the aforementioned car navigation device CN.

As is shown in FIG. 2, the control device 18 is provided with a CPU 52, RAM 54, ROM 56 that serves as a non-volatile storage unit for storing a communication control program 58, and an input/output interface unit (I/O) 60 that performs communication with external devices, and these are mutually connected to each other via a bus 62. Additionally, the aforementioned receiver 28, front transmitter 30, rear transmitter 32, left transmitter 34, right transmitter 36, rotary switch 38, front switch 40, rear switch 42, left switch 44, right switch 46, display 48, and speakers 50 are also connected to the I/O 60. In this control device 18, the communication control program 58 is read from the ROM 56 and expanded in the RAM 54, and the communication control program 58 expanded in the RAM 54 is then executed by the CPU 52.

Multiple types of intention information showing intentions of an occupant of the host vehicle V1, and transmitting vehicle information showing the transmission source of the intention information are stored in the ROM 56. For example, textual information (not shown in the drawings) and graphic information GI (see FIG. 3) are included in the multiple types of intention information. Textual information is in the form of written information such as, for example, 'Thank you', 'Sorry', 'Please go ahead', 'I've broken down', 'Danger', 'Fallen object ahead', 'Please allow me to turn right', 'Please allow me to turn left', 'Please allow me to enter the lane', and the like. The graphic information GI is formed by animation information representing animated characters such as, for example, animals and fictitious creatures and the like. Such animated characters are able to represent an intention of a vehicle occupant by, for example, making a small bow or the like. Note that, in FIG. 3, an example is shown in which graphic information GI is displayed on the transparent display 48 (i.e., on the windshield portion WS). This graphic information GI may also be in the form of graphic information that is commonly used to express intentions (i.e., emotions) such as impatience, anger and the like A particular item of intention information is selected from among the above-described multiple types of intention information as a result of a rotation operation being performed on the above-described rotary switch 38. The selected item of intention information is then set as the intention information to be transmitted to another vehicle V2 (hereinafter, this may be referred to as 'intention information for transmission'), and is displayed on the display 48 (for example, on the multi-information display 48D).

Included in the transmitting vehicle information is information such as the 'vehicle type, 'vehicle model', 'vehicle color', 'automobile registration number', and the like for the host vehicle V1. A structure in which this transmitting vehicle information is stored in advance in the ROM 56, for example, prior to the host vehicle V1 being delivered as a new vehicle or as a used vehicle to a new owner is employed.

The communication control unit 20 is formed such that, when a pressing operation is performed on one of the front switch 40, the rear switch 42, the left switch 44, or the right switch 46, the communication control unit 20 controls the communication unit 12 and causes the communication unit 12 to transmit intention information for transmission. More specifically, when a pressing operation is performed on the front switch 40, the communication control unit 20 causes the intention information for transmission to be transmitted by the front transmitter 30. In the same way, the communication control unit 20 causes the intention information for transmission to be transmitted by the rear transmitter 32 when a pressing operation is performed on the rear switch 42, and by the left transmitter 34 when a pressing operation is performed on the left switch 44, and by the right transmitter 36 when a pressing operation is performed on the right switch 46.

Moreover, the communication control unit 20 is also formed such that, when the intention information for transmission is being transmitted by one of the above-described transmitters, the transmitting vehicle information is also transmitted together with the intention information for transmission. Note that the pressing operation described above corresponds to transmission instructions input into the instruction unit 24 by an occupant of the host vehicle V1. Instructions for the transmission direction (i.e., vehicle front side, vehicle rear side, vehicle left side, and vehicle right side) are included in the transmission instructions.

The notification control unit 22 is formed such that, when the receiver 28 of the communication unit 12 receives intention information for transmission and transmitting vehicle information from another vehicle V2, the notification control unit 22 controls the notification execution unit 16, and causes the occupant of the host vehicle V1 to be notified about these information items. More specifically, the notification control unit 22 causes the intention information for transmission and transmitting vehicle information received by the communication unit 12 to be displayed on the display 48, and also causes the respective information to be output as audio from the speakers 50. Note that it is also possible to employ a structure in which just one of the intention information for transmission or the transmitting vehicle information is displayed on the display 48, while the other one thereof is output as audio via the speakers 50. Moreover, in the following description, in some cases, the intention information for transmission and transmitting vehicle information transmitted by the communication unit 12 of the host vehicle V1 to another vehicle V2 are referred to as 'transmission information', while the intention information for transmission and transmitting vehicle information received by the communication unit 12 of the host vehicle V1 from another vehicle V2 are referred to as 'reception information'.

Figure 5:
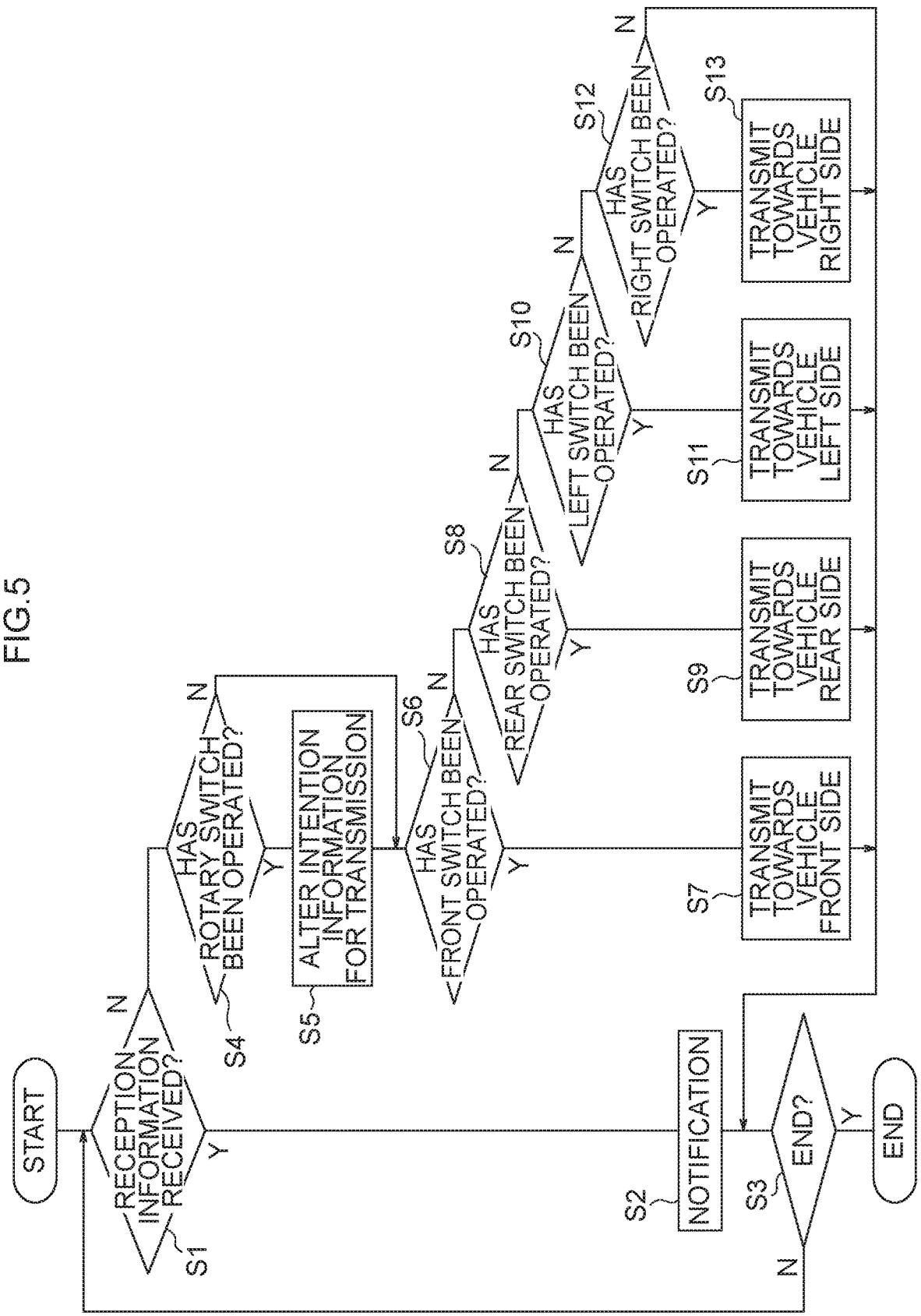
FIG. 5 is a flowchart showing a flow of processing executed by the control device of the vehicle on-board communication device according to the first exemplary embodiment.

Next, the communication control processing executed by the control device 18 will be described with reference to the flowchart shown in FIG. 5. When, for example, an ignition switch (not shown in the drawings) of the host vehicle V1 is turned on, the control device 18 starts executing the communication control program 58. When the communication control program 58 is started, firstly, in step S1, it is determined by the communication control unit 20 whether or not the communication unit 12 has received reception information from another vehicle V2. If this determination is negative, the routine moves to step S4, while if the determination is affirmative, the routine moves to step S2.

In step S2, based on an output from the communication control unit 20, the notification control unit 22 controls the notification execution unit 16, and causes the occupant of the host vehicle V1 to be notified about the reception information. Once the processing of step S2 is completed, the routine moved to step S3. In step S3, the control device 18 determines whether or not the driving of the host vehicle V1 has ended based, for example, on whether or not the ignition switch of the host vehicle V1 has been turned off. If this determination is negative, the routine moves to the above-described step S1, while if the determination is affirmative, the communication control processing shown in FIG. 5 is ended.

If, on the other hand, the determination in step S1 is negative and the routine moves to step S4, the communication control unit 20 then determines whether or not a rotation operation has been performed on the rotary switch 38. If this determination is negative, the communication control unit 20 leaves the intention information item selected immediately prior to the ending of the previous driving set as the intention information for transmission, and the routine moves to step S6.

If, on the other hand, the determination by the control device 18 in step S4 is affirmative, the routine moves to step S5. In step S5, the communication control unit 20 alters the setting of the intention information for transmission to the intention information item selected by the aforementioned rotation operation, and the routine moves to step S6.

In step S6, whether or not the front switch 40 has been operated is determined by the communication control unit 20. If this determination is negative, the routine moves to step S8, while if this determination is affirmative, the routine moves to step S7. In step S7, the communication control unit 20 causes the front transmitter 30 to transmit the transmission information. Once the processing of step S7 has ended, the routine returns to the above-described step S3.

In step S8, whether or not the rear switch 42 has been operated is determined by the communication control unit 20. If this determination is negative, the routine moves to step S10, while if this determination is affirmative, the routine moves to step S9. In step S9, the communication control unit 20 causes the rear transmitter 32 to transmit the intention information for transmission. Once the processing of step S9 has been completed, the routine returns to the above-described step S3.

In step S10, whether or not the left switch 44 has been operated is determined by the communication control unit 20. If this determination is negative, the routine moves to step S12, while if this determination is affirmative, the routine moves to step S11. In step S11, the communication control unit 20 causes the left transmitter 34 to transmit the intention information for transmission. Once the processing of step S11 has been completed, the routine returns to the above-described step S3.

In step S12, whether or not the right switch 46 has been operated is determined by the communication control unit 20. If this determination is negative, the routine returns to the above-described step S3, while if this determination is affirmative, the routine moves to step S13. In step S13, the communication control unit 20 causes the right transmitter 36 to transmit the intention information for transmission. Once the processing of step S13 has been completed, the routine returns to the above-described step S3.

(Actions and Effects)

Next, actions and effects of the present exemplary embodiment will be described.

In the present exemplary embodiment, when an occupant of the host vehicle V1 performs a rotation operation on the rotary switch 38, one particular intention information item is selected from among the multiple types of intention information stored in the ROM 56 of the control device 18. When the vehicle occupant then operates the operating unit 14, this selected intention information item is transmitted via wireless communication to other vehicles V2 by the communication unit 12. Additionally, when the communication unit 12 receives intention information from another vehicle V2, the notification unit 26 notifies the vehicle occupant of the host vehicle V1 about the received intention information. As a result, intentions of vehicle occupants can be transmitted irrespective of the traveling state of the vehicles or the weather conditions or the like.

Figure 6:
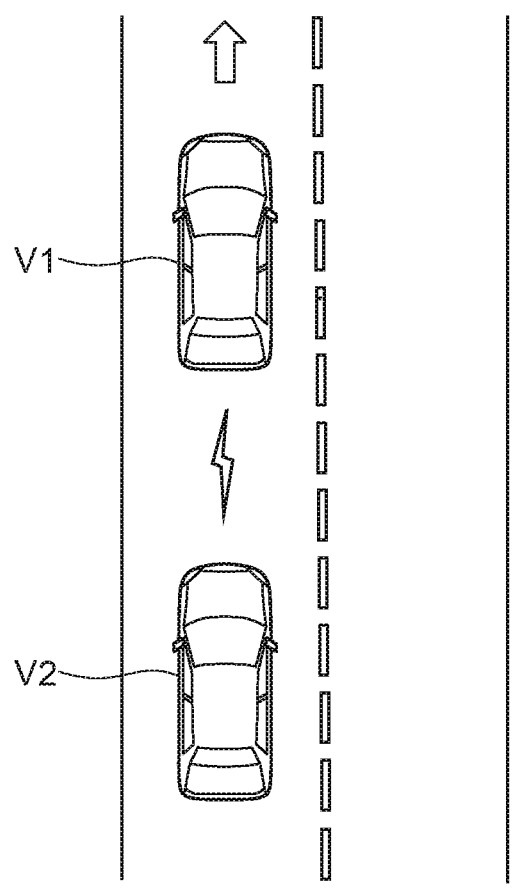
FIG. 6 is a plan view showing a situation in which intention information is being transmitted and received between a host vehicle, which is traveling in front, and another vehicle, which is traveling behind.

More specifically, for example, as is shown in FIG. 6, when an occupant of the host vehicle V1, which is traveling in front, selects intention information such as 'Please go ahead', or 'Fallen object ahead', and performs a pressing operation on the rear switch 42, the relevant intention information is transmitted towards the rear of the vehicle by the communication unit 12. The transmitted intention information is received by the communication unit 12 of the other vehicle V2, which is traveling behind, and the communication unit 12 of the other vehicle V2 then notifies an occupant of this other vehicle V2 about this received intention information. As a result, intentions of vehicle occupants can be transmitted between the host vehicle V1 and another vehicle V2 even in conditions in which visibility is poor, such as at night, or in thick fog or the like.

Figure 7:
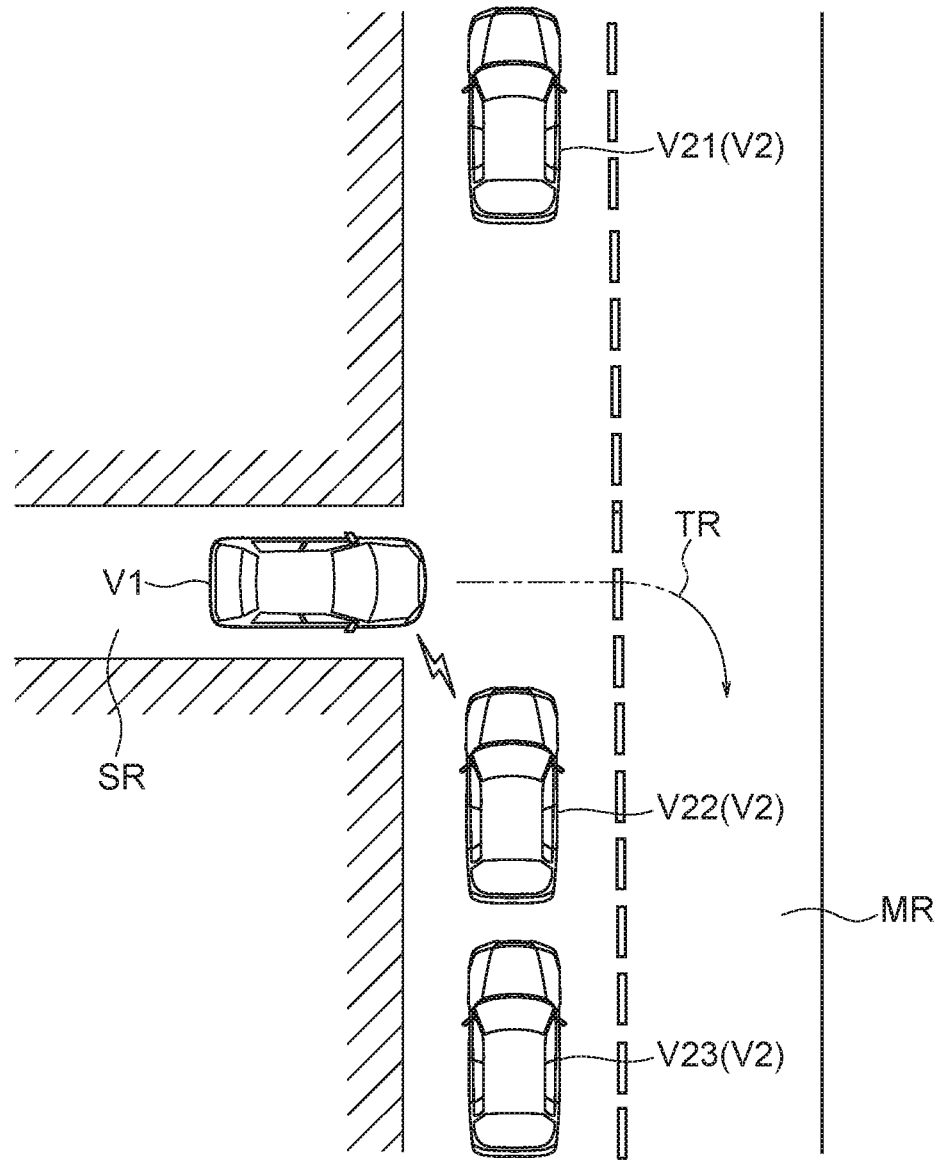
FIG. 7 is a plan view plan view showing a situation in which intention information is being transmitted and received between a host vehicle, which is waiting on a side road, and another vehicle, which is traveling on a main road.

Moreover, for example, as is shown in FIG. 7, when an occupant of the host vehicle V1 who desires to turn right from a side road SR into a main road MR (see an arrow TR in FIG. 7) selects intention information such as 'Please allow me to turn right', and performs a pressing operation on the right switch 46, the relevant intention information is transmitted towards the right side of the vehicle by the communication unit 12. The transmitted intention information is received by the communication unit 12 of another vehicle V22, which is located on the main road MR on the right side of the host vehicle V1, and the communication unit 12 of the other vehicle V22 then notifies an occupant of this other vehicle V22 about the received intention information. If, as a result of this notification, the occupant of the other vehicle V22 permits the right turn, the occupant of the host vehicle V1 selects intention information such as, for example, 'Thank you', and performs a pressing operation on the right switch 46 so as to convey their gratitude to the occupant of the other vehicle V22. As a result, intentions of vehicle occupants can be accurately transmitted between the host vehicle V1 and the other vehicle V22.

Moreover, in the present exemplary embodiment, the communication unit 12 transmits and receives transmitting vehicle information, which shows the source of the intention information transmission, together with the intention information, and the notification unit 26 notifies the occupant of the host vehicle V1 about the transmitting vehicle information received by the communication unit 12 together with the intention information. As a result, it is possible to prevent any ambiguity as to the source of the intention information transmission.

Furthermore, in the present exemplary embodiment, when the occupant of the host vehicle V1 is transmitting intention information to the other vehicle V2, by performing a rotation operation on the rotary switch 38 that vehicle occupant selects one particular intention information item to be transmitted by the communication unit 12 from among the multiple types of intention information stored in the instruction unit 24. As a result, it is possible to reduce the burden on the occupant of the host vehicle V1 of having to think up the contents of the intention information to be transmitted to the other vehicle V2.

Moreover, in the present exemplary embodiment, the notification unit 26 is provided with the display 48 that displays the reception information received by the communication unit 12 on at least one of the windshield portion WS or the instrument panel IP of the host vehicle V1. As a result, an occupant of the host vehicle V1 is able to visually confirm intention information transmitted from another vehicle V2.

Moreover, in the present exemplary embodiment, an instruction concerning the direction in which the intention information is to be transmitted is contained in the transmission instructions input by the occupant of the host vehicle V1 into the instruction unit 24, and the communication unit 12 transmits the intention information in the transmission direction that was input into the instruction unit 24. In a structure of this type, because it is not necessary to detect the destination of the intention information transmission, the device structure can be simplified compared to when the destination of the intention information transmission does need to be detected.

Furthermore, in the present exemplary embodiment, the instruction unit 24 is provided with the operating unit 14 (i.e., the rotary switch 38, the front switch 40, the rear switch 42, the left switch 44, and the right switch 46). As a consequence, an occupant of the host vehicle V1 is able to input an instruction to transmit intention information into the instruction unit 24 by operating the operating unit 14.

(Supplementary Description of the First Exemplary Embodiment)

In the above-described first exemplary embodiment, a structure is employed in which there are provided the front transmitter 30, the rear transmitter 32, the left transmitter 34, the right transmitter 36, the front switch 40, the rear switch 42, the left switch 44, and the right switch 46 so that transmission information can be transmitted selectively towards any of the vehicle front side, the vehicle rear side, the vehicle left side and the vehicle right side, however, the present disclosure is not limited to this. In other words, in addition to the above structure, it is also possible for transmitters and switches to be added that enable transmission information to be selectively transmitted diagonally towards a vehicle front-left direction, diagonally towards a vehicle front-right direction, diagonally towards a vehicle rear-left direction, and diagonally towards a vehicle rear-right direction.

Additionally, it is also possible to employ a structure in which, for example, transmission information can be selectively transmitted only towards the vehicle front side and towards the vehicle rear side, or a structure in which transmission information can be transmitted only towards the vehicle front side or only towards the vehicle rear side. In this case, it is possible for the transmitters and switches to be omitted for directions in which transmission information is unable to be transmitted. Additionally, in this case, it is also possible to employ a structure in which, for example, hazard switches and the like that are used to cause hazard lights to flash on and off are formed by the operating unit (i.e., the instruction input unit). Moreover, if, for example, a transmitter whose transmission direction is capable of being altered to the front, the rear, the left, and the right is utilized, then only a single transmitter need be provided.

Furthermore, it is also possible to employ a structure in which, for example, a direction indicating lever that is used to cause directional indicators (i.e., winkers) of the host vehicle V1 to flash on and off is formed by the operating unit, and the communication control unit causes the communication unit to transmit intention information (for example, intention information such as 'Thank you') in accordance with an operation of the direction indicating lever. In this case, a structure is employed in which, for example, the communication unit causes intention information to be transmitted within a previously set range (for example, within a range of several tens of meters from the host vehicle V1) via a broadcast. By employing this structure, for example, in a situation such as that shown in FIG. 7 (i.e., a situation in which the right-turn winker of the host vehicle V1 is flashing on and off), intention information such as 'Thank you' can be transmitted from the host vehicle V1 to the other vehicle V2 3.

Moreover, in the above-described first exemplary embodiment, a structure is employed in which multiple types of intention information are stored in the ROM 56 of the control device 18, and one intention information item is selected from among the multiple types of intention information as the intention information for transmission via a rotation operation input into the rotary switch 38, however, the present disclosure is not limited to this. In other words, it is also possible to employ a structure in which, for example, the aforementioned multiple types of intention information are displayed on the center display 48A (i.e., on a touch panel), and one intention information item is selected from among the multiple types of intention information as the intention information for transmission via a touch operation input into this center display 48A. Additionally, it is also possible to employ a structure in which only one intention information item (for example, textual information such as 'Thank you') is stored in the control device 18. In this case, the structure (i.e., the rotary switch 38 and the like) used to select the intention information for transmission is no longer required.

In addition, in the above-described first exemplary embodiment, a structure is employed in which the notification execution unit 16 is provided with the display 48 and the speakers 50, however, the present disclosure is not limited to this and it is also possible to employ a structure in which one of the display 48 or the speakers 50 are omitted.

Next, another exemplary embodiment of the present disclosure will be described. Note that component elements and actions that are fundamentally the same as in the above-described exemplary embodiment are given the same descriptive symbols as in the above-described exemplary embodiment, and any description thereof is omitted.

Second Embodiment

Figure 8:
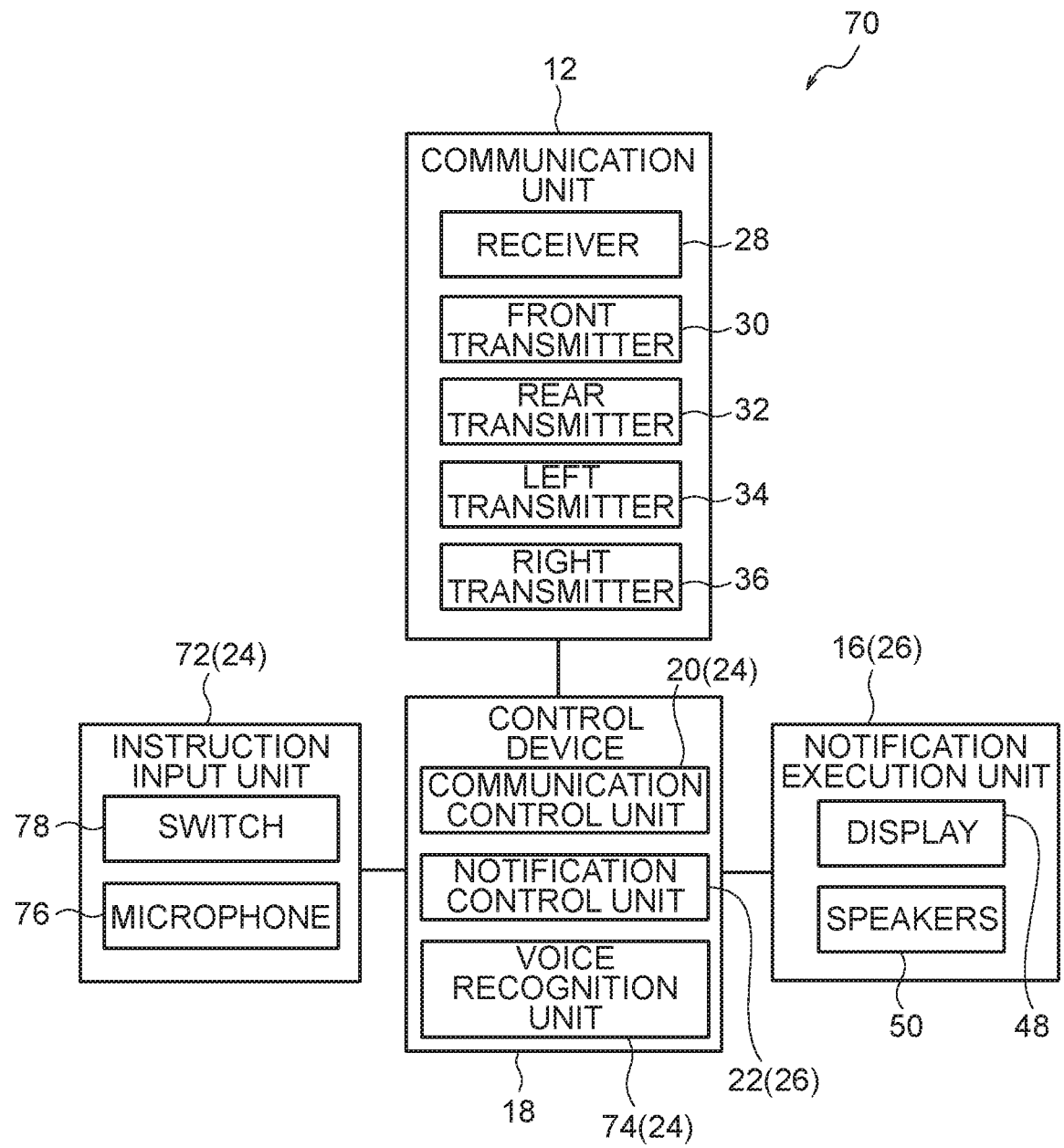
FIG. 8 is a block diagram showing the schematic structure of a vehicle on-board communication device according to a second exemplary embodiment of the present disclosure.

FIG. 8 is a block diagram showing the schematic structure of a vehicle on-board communication device 70 according to a second exemplary embodiment of the present disclosure. In this exemplary embodiment, a vehicle on-board communication device 70 is installed in each of the host vehicle V1 and the other vehicles V2. This vehicle on-board communication device 70 is provided with an instruction input unit 72 that is different from the operating unit (i.e., instruction input unit) 14 according to the first exemplary embodiment. Additionally, in this exemplary embodiment, the control device 18 is provided with a voice recognition unit 74. This voice recognition unit 74, along with the instruction input unit 72 and the communication control unit 20, together form the instruction unit 24. This instruction unit 24 is formed so as to be able to receive transmission instructions by voice (hereinafter, these may be referred to as 'voice instructions') from an occupant of the host vehicle V1.

The instruction input unit 72 is provided with a microphone 76, which serves as a voice acquisition unit, and a single switch (i.e., operating unit) 78 that is used to turn the microphone 76 on and off. The microphone 76 is provided, for example, above the instrument panel IP (see FIG. 3) in front of the driver's seat, while the switch 78 is provided in a position where it is easily operated by the driver of the host vehicle V1 (for example, in the steering wheel portion SW shown in FIG. 3). The microphone 76 and the switch 78 are connected to the I/O 60 (see FIG. 2) of the control device 18.

Multiple types of audio data corresponding to the aforementioned voice instructions are stored in the ROM 56 of the control device 18. Data showing the intention of the occupant of the host vehicle V1, and data showing the transmission direction such as, for example, 'transmit "Thank you" towards the front', or 'transmit "Danger" towards the rear' are contained in the audio data. The microphone 76 is formed so as to be turned on while a pressing operation is being performed on the switch 78, and turned off when no pressing operation is being performed on the switch 78. The voice recognition unit 74 of the control device 18 is formed so as to recognize voice instructions by comparing an output from the microphone 76 with audio data stored in the ROM.

Figure 9:
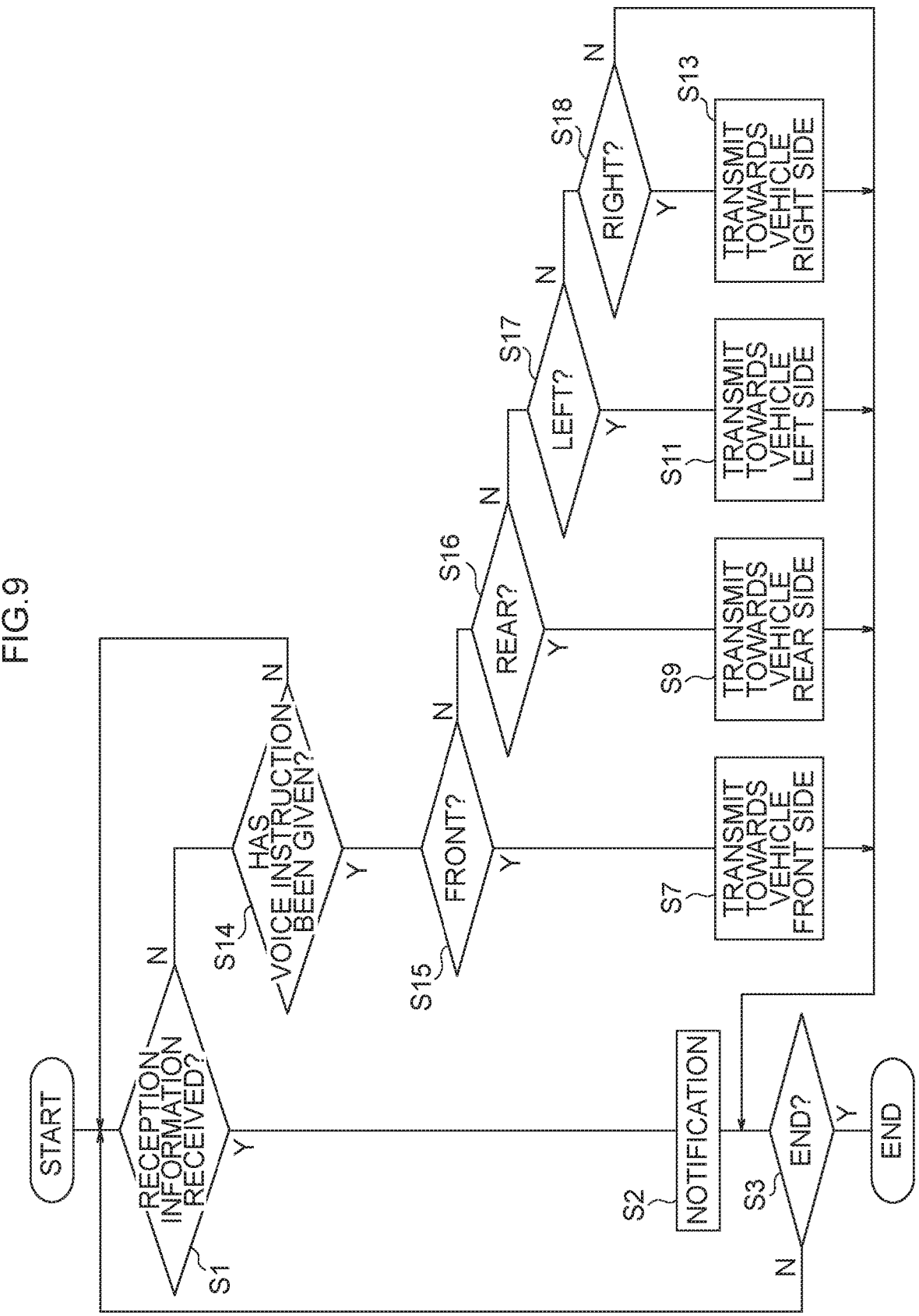
FIG. 9 is a flowchart showing a flow of processing executed by a control device of the vehicle on-board communication device according to the second exemplary embodiment.

Next, communication control processing executed by the control device 18 according to the present exemplary embodiment will be described with reference to a flowchart shown in FIG. 9. In steps S1 through S3, S7, S9, S11, and S13, the control device 18 executes the same type of processing as in the first exemplary embodiment. If the determination by the control device 18 in step S1 is negative, the routine moves to step S14. In step S14, based on an output from the microphone 76, the voice recognition unit 74 determines whether or not a voice instruction has been received from an occupant of the host vehicle V1. More specifically, the voice recognition unit 74 determines whether or not a voice acquired by the microphone 76 matches any of the multiple types of audio data stored in the ROM 56. If this determination is negative, in other words, if an acquired voice does not match any of the audio data stored in the ROM 56, it is determined that there is 'no voice instruction input', and the routine returns to step S1. If, on the other hand, the aforementioned determination is affirmative, namely, if the acquired voice does match any of the audio data stored in the ROM 56, it is determined that there is 'voice instruction input', and the routine moves to step S15.

In step S15, the voice recognition unit 74 determines whether or not the instruction for the transmission direction contained in the acquired voice was 'front'. If this determination is negative, the routine moves to step S16, while if the determination is affirmative, the routine moves to step S7. In step S7, the communication control unit 20 controls the communication unit 12 based on the output from the voice recognition unit 74, and causes transmission information corresponding to the voice instruction to be transmitted towards the vehicle front side.

In step S16, the voice recognition unit 74 determines whether or not the instruction for the transmission direction contained in the acquired voice was 'rear'. If this determination is negative, the routine moves to step S17, while if the determination is affirmative, the routine moves to step S9. In step S9, the communication control unit 20 controls the communication unit 12 based on the output from the voice recognition unit 74, and causes transmission information corresponding to the voice instruction to be transmitted towards the vehicle rear side.

In step S17, the voice recognition unit 74 determines whether or not the instruction for the transmission direction contained in the acquired voice was 'left. If this determination is negative, the routine moves to step S18, while if the determination is affirmative, the routine moves to step S11.

In step S11, the communication control unit 20 controls the communication unit 12 based on the output from the voice recognition unit 74, and causes transmission information corresponding to the voice instruction to be transmitted towards the vehicle left side.

In step S18, the voice recognition unit 74 determines whether or not the instruction for the transmission direction contained in the acquired voice was 'right. If this determination is negative, the routine moves to step S3, while if the determination is affirmative, the routine moves to step S13. In step S13, the communication control unit 20 controls the communication unit 12 based on the output from the voice recognition unit 74, and causes transmission information corresponding to the voice instruction to be transmitted towards the vehicle right side.

In this exemplary embodiment, structure other than that described above is the same as in the first exemplary embodiment. Therefore, in this exemplary embodiment as well, intentions of vehicle occupants can be transmitted between the host vehicle V1 and other vehicles V2 irrespective of the vehicle running state and the weather conditions. Moreover, in this exemplary embodiment, an occupant of the host vehicle V1 is able to transmit instructions to the instruction unit 24 via their voice.

Third Exemplary Embodiment

Figure 10:
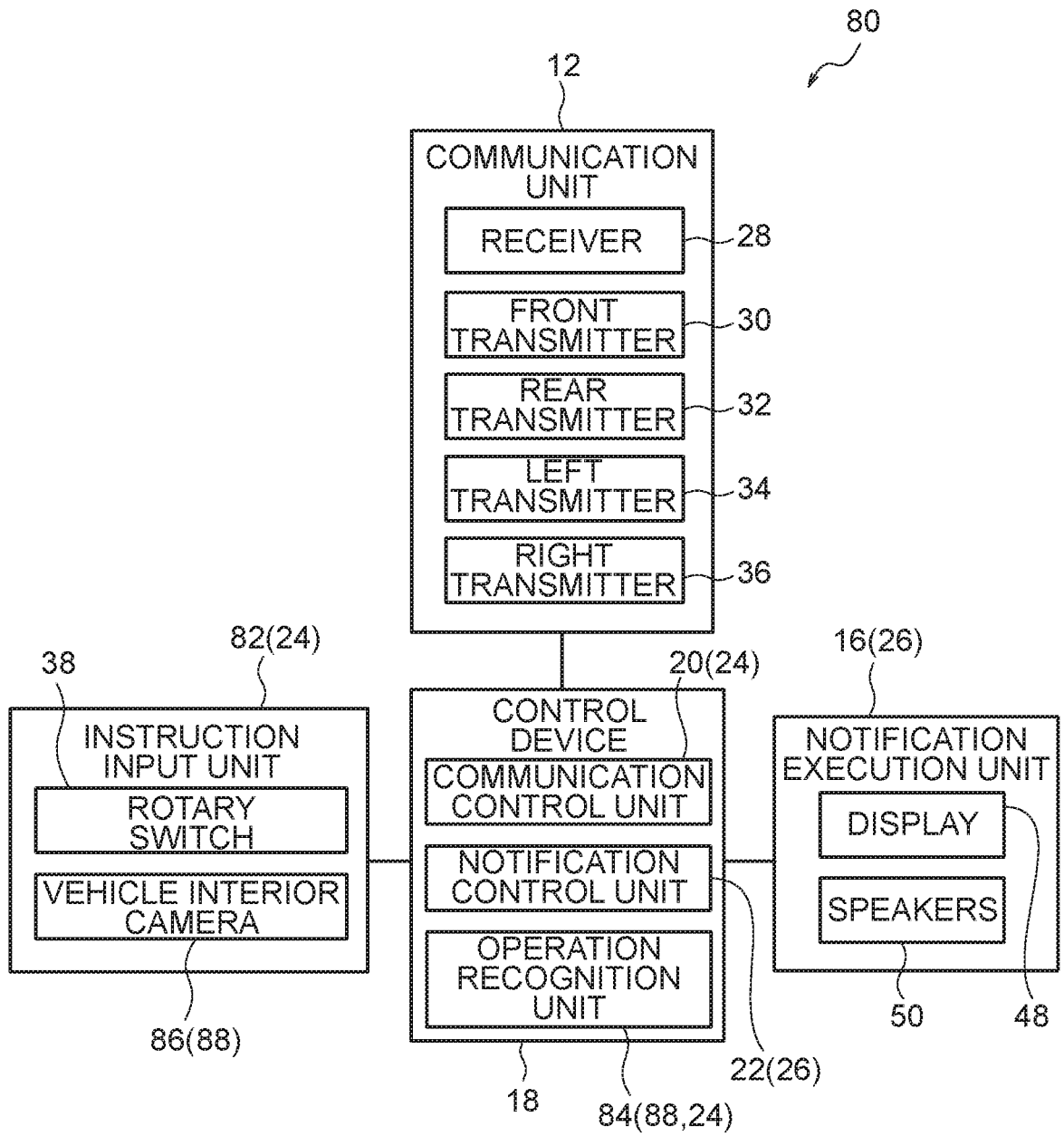
FIG. 10 is a block diagram showing the schematic structure of a vehicle on-board communication device according to a third exemplary embodiment of the present disclosure.

FIG. 10 is a block diagram showing the schematic structure of a vehicle on-board communication device 80 according to a third exemplary embodiment of the present disclosure. In this exemplary embodiment, a vehicle on-board communication device 80 is installed in each of the host vehicle V1 and the other vehicles V2. This vehicle on-board communication device 80 is provided with an instruction input unit 82 that is different from the operating unit (i.e., instruction input unit) 14 according to the first exemplary embodiment. Additionally, in this exemplary embodiment, the control device 18 is provided with an operation recognition unit 84. This operation recognition unit 84, along with the instruction input unit 82 and the communication control unit 20, together form the instruction unit 24. This instruction unit 24 is formed so as to be able to receive transmission instructions via gestures (hereinafter, these may be referred to as 'operation instructions') from an occupant of the host vehicle V1.

The instruction input unit 82 is provided with the rotary switch 38, and a vehicle interior camera 86 (see FIG. 3) that captures images of an occupant (in this case, the driver) of the host vehicle V1. The rotary switch 38 is the same type of rotary switch as that employed in the first exemplary embodiment, and an occupant of the host vehicle V1 performs a rotation operation on the rotary switch 38 in order to select intention information for transmission. The vehicle interior camera 86 is provided, for example, on the vehicle cabin interior side of an upper end portion of the windshield portion WS, and captures images of an upper body portion of the occupant of the host vehicle V1. The vehicle interior camera 86 is connected to the I/O 60 (see FIG. 2) of the control device 18. The vehicle interior camera 86 and the operation recognition unit 84 of the control device 18 form an operation detecting unit 88 that detects an operation performed by a vehicle occupant of the host vehicle V1.

More specifically, multiple types of image data corresponding to the aforementioned operating instructions are stored in the ROM 56 of the control device 18. Data showing, for example, the direction of the line of sight of a vehicle occupant of the host vehicle V1, as well as the orientation of their face, movement of their eyeballs, movement of their face, movement of their mouth, movement of their arms, movement of their hands, and movement of their fingers and the like is contained in this image data. The operation recognition unit 84 of the control device 18 is formed so as to recognize operation instructions by comparing images captured by the vehicle interior camera 86 with image data stored in the ROM. More specifically, if, for example, the occupant of the host vehicle V1 raises their right hand at the same time as their line of sight is facing towards the right, the operation recognition unit 84 recognizes that an operation instruction that contains a transmission direction instruction to 'transmit to the right' has been made. The communication control unit 20 then controls the communication unit 12 based on an output from the operation recognition unit 84. As a result, a structure is created in which the communication unit 12 transmits the intention information for transmission that has been selected by the rotation operation of the rotary switch 38 together with transmitting vehicle information towards the vehicle right side. Note that, in the present exemplary embodiment, a structure is employed in which the intention information for transmission is selected via a rotation operation performed on the rotary switch 38, however, the present disclosure is not limited to this and it is also possible for intention information for transmission to be selected by the occupant of the host vehicle V1 making a gesture. In this case, a selection operation unit such as the rotary switch 38 or the like is no longer required.

Figure 11:
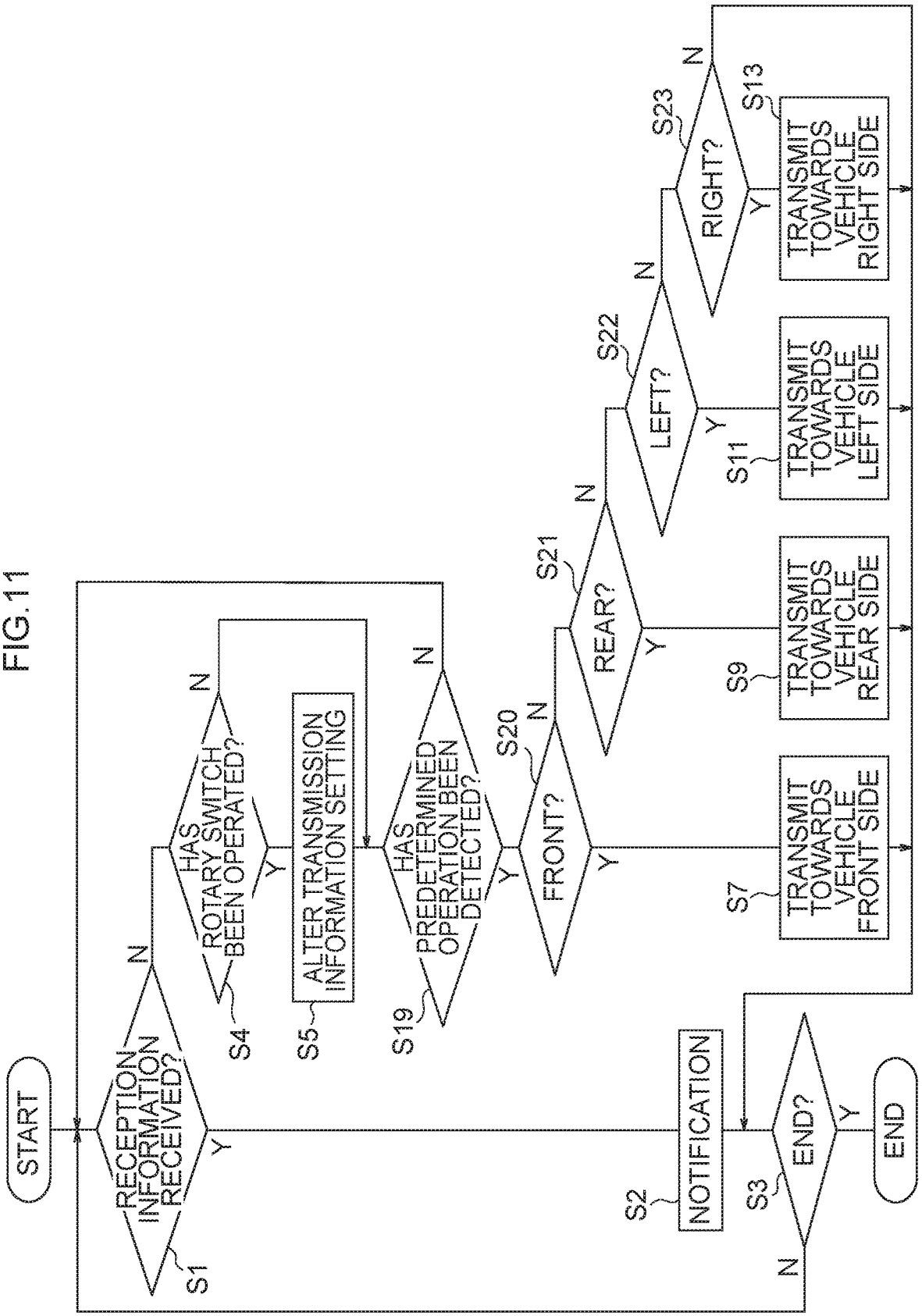
FIG. 11 is a flowchart showing a flow of processing executed by a control device of the vehicle on-board communication device according to the third exemplary embodiment.

Next, communication control processing executed by the control device 18 according to the present exemplary embodiment will be described with reference to a flowchart shown in FIG. 11. In steps S1 through S5, S7, S9, S11, and S13, the control device 18 executes the same type of processing as in the first exemplary embodiment, however, if the determination in step S4 is negative, or if the determination in step S5 is completed, then the routine moves to step S19. In step S19, based on an output from the vehicle interior camera 86, the operation recognition unit 84 determines whether or not an operation instruction has been received from an occupant of the host vehicle V1. More specifically, the operation recognition unit 84 determines whether or not images captured by the vehicle interior camera 86 match any of the multiple types of image data stored in the ROM 56. If this determination is negative, in other words, if the captured images do not match any of the image data stored in the ROM 56, it is determined that there is 'no operation instruction input', and the routine returns to step S1. If, on the other hand, the aforementioned determination is affirmative, namely, if the captured images do match any of the image data stored in the ROM 56, it is determined that there is 'operation instruction input', and the routine moves to step S20.

In step S20, the operation recognition unit 84 determines whether or not the instruction for the transmission direction contained in the captured images was 'front'. If this determination is negative, the routine moves to step S21, while if the determination is affirmative, the routine moves to step S7. In step S7, the communication control unit 20 controls the communication unit 12 based on the output from the operation recognition unit 84, and causes transmission information corresponding to the operation instruction to be transmitted towards the vehicle front side.

In step S21, the operation recognition unit 84 determines whether or not the instruction for the transmission direction contained in the captured images was 'rear'. If this determination is negative, the routine moves to step S22, while if the determination is affirmative, the routine moves to step S9. In step S9, the communication control unit 20 controls the communication unit 12 based on the output from the operation recognition unit 84, and causes transmission information corresponding to the operation instruction to be transmitted towards the vehicle rear side.

In step S22, the operation recognition unit 84 determines whether or not the instruction for the transmission direction contained in the captured images was 'left'. If this determination is negative, the routine moves to step S23, while if the determination is affirmative, the routine moves to step S11. In step S11, the communication control unit 20 controls the communication unit 12 based on the output from the operation recognition unit 84, and causes transmission information corresponding to the operation instruction to be transmitted towards the vehicle left side.

In step S23, the operation recognition unit 84 determines whether or not the instruction for the transmission direction contained in the captured images was 'right'. If this determination is negative, the routine moves to step S3, while if the determination is affirmative, the routine moves to step S13. In step S13, the communication control unit 20 controls the communication unit 12 based on the output from the operation recognition unit 84, and causes transmission information corresponding to the operation instruction to be transmitted towards the vehicle right side.

In this exemplary embodiment, structure other than that described above is the same as in the first exemplary embodiment. Therefore, in this exemplary embodiment as well, intentions of vehicle occupants can be transmitted between the host vehicle V1 and other vehicles V2 irrespective of the vehicle running state and the weather conditions. Moreover, in this exemplary embodiment, an occupant of the host vehicle V1 is able to transmit instructions to the instruction unit 24 using gestures.

Fourth Exemplary Embodiment

Figure 12:
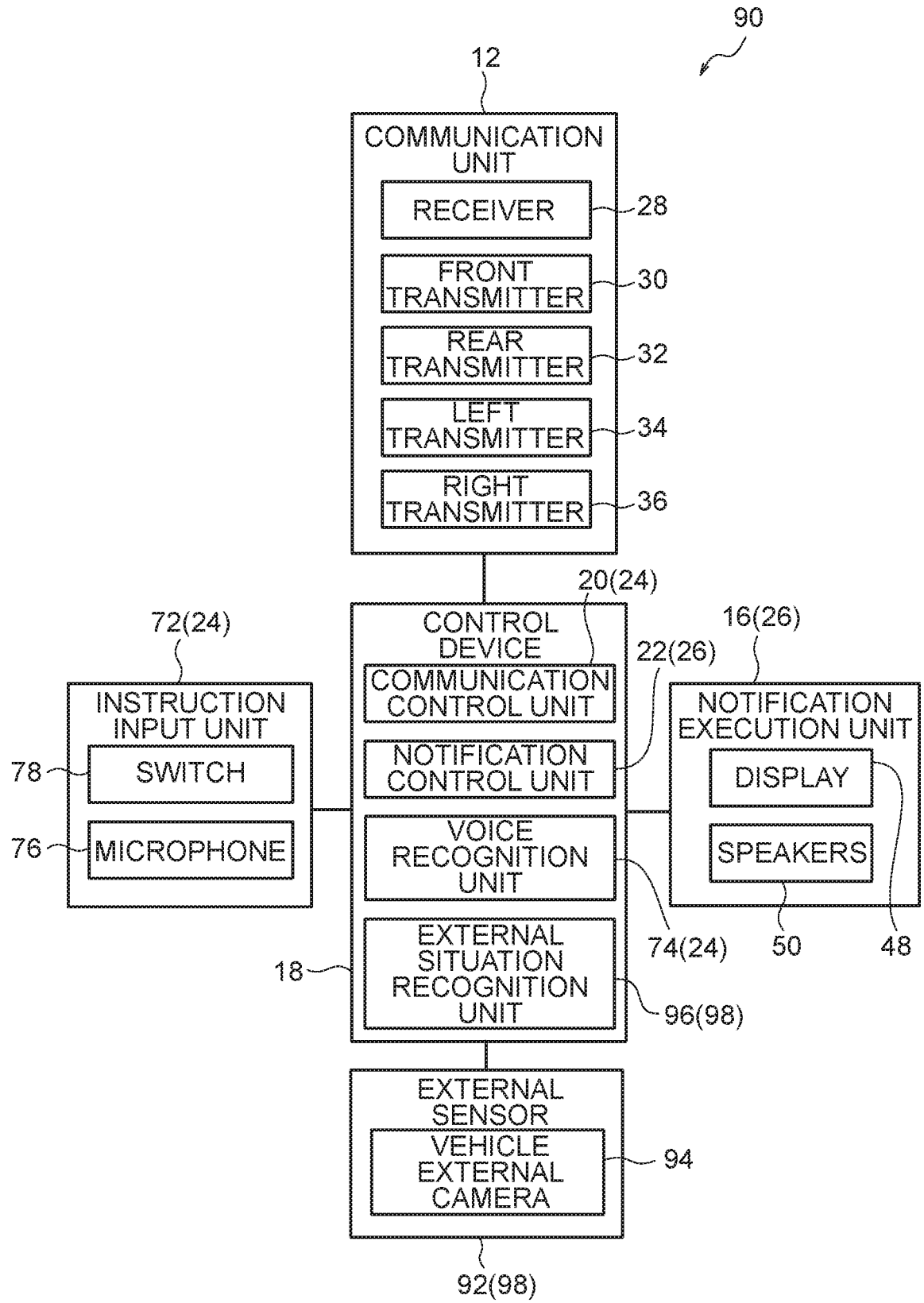
FIG. 12 is a block diagram showing the schematic structure of a vehicle on-board communication device according to a fourth exemplary embodiment of the present disclosure.

FIG. 12 is a block diagram showing the schematic structure of a vehicle on-board communication device 90 according to a fourth exemplary embodiment of the present disclosure. In this exemplary embodiment, a vehicle on-board communication device 90 is installed in each of the host vehicle V1 and the other vehicles V2. This vehicle on-board communication device 90 is provided with the same instruction input unit 72 as the instruction input unit 72 according to the second exemplary embodiment. Additionally, in this exemplary embodiment, the display 48 includes the transparent display 48C (see FIG. 3). Note that it is also possible to employ a structure in which the operating unit (i.e., the instruction input unit) 14 according to the first exemplary embodiment, or the instruction input unit 82 according to the third exemplary embodiment is provided instead of the instruction input unit 72.

Furthermore, in this exemplary embodiment, an external sensor 92 is connected to the I/O 60 of the control device 18, and the control device 18 is provided with an external situation recognition unit 96. The external sensor 92 and the external situation recognition unit 96 form a transmission source detecting unit 98 that detects a position of another vehicle V2 that is the source of an intention information transmission received by the communication unit 12.

The external sensor 92 includes a vehicle external camera 94 that captures images of at least a front side of the host vehicle V1. The external sensor 92 may include at least one of radar and LIDAR (Laser Imaging Detection and Ranging) in addition to the vehicle external camera 94. The vehicle external camera 94 may be provided, for example, on the vehicle cabin interior side of the upper end portion of the windshield portion WS of the host vehicle V1. The vehicle external camera 94 may be a monocular camera or a stereo camera. A stereo camera is provided with two image capture units, and these are positioned so as to reproduce binocular disparity. Information relating to a depth direction is included in the image capture information of a stereo camera. The radar transmits radio waves (for example, milliwaves) around the vehicle, and detects obstacles by receiving radio waves reflected by these obstacles. The LIDAR emits light around the vehicle, and detects obstacles by receiving light reflected by an obstacle, and measuring the distance to the point of reflection.

Figure 14:
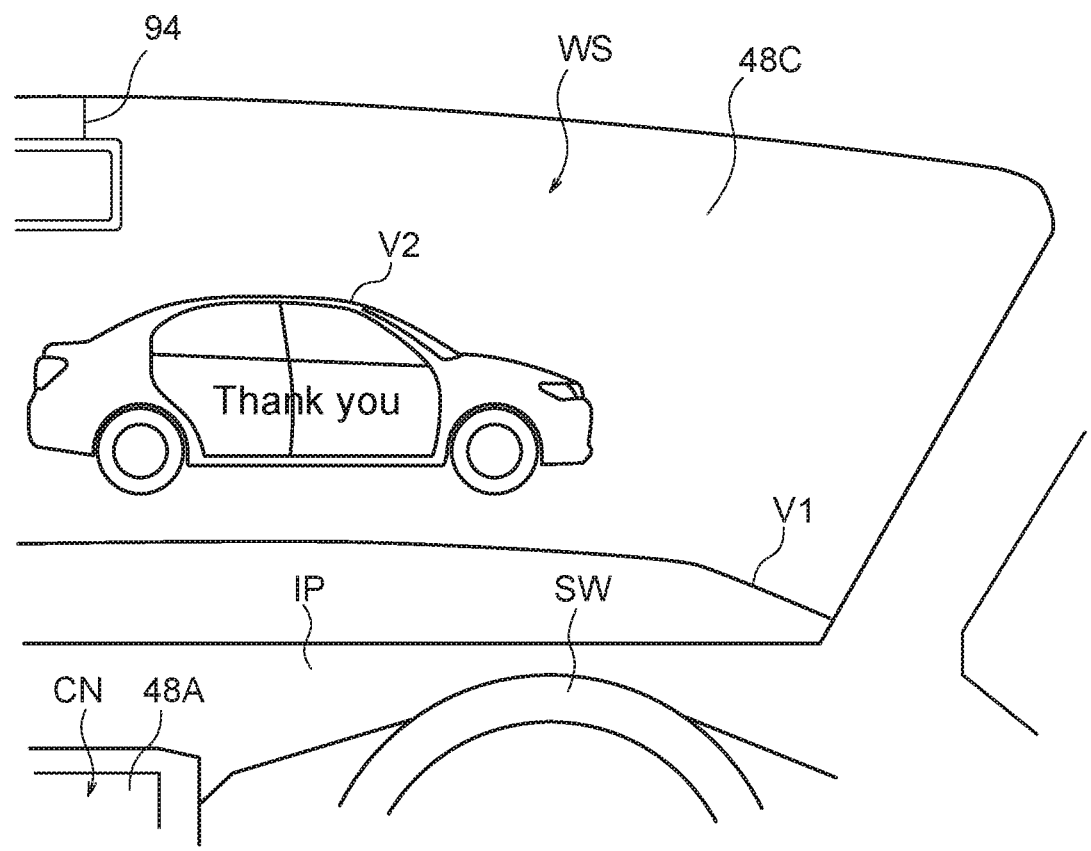
FIG. 14 is a perspective view showing an example of a case in which intention information received by the communication unit of a host vehicle is displayed on a windshield portion so as to appear superimposed on another vehicle, which is the source of the transmission, as seen from the perspective of the driver of the host vehicle.

The external situation recognition unit 96 recognizes a situation on the front side of the host vehicle V1 based on an output from the external sensor 92 when the communication unit 12 receives reception information from another vehicle V2. The external situation recognition unit 96 then compares the recognized situation with the transmitting vehicle information included in the reception information. As a result, a structure is created in which the external situation recognition unit 96 is able to determine whether or not the other vehicle V2 which is the source of a particular transmission is located on the front side of the host vehicle V1. More specifically, the external situation recognition unit 96 determines whether or not the other vehicle V2 is located within an area that overlaps with the windshield portion WS when viewed from the perspective of the driver of the host vehicle V1. Note that, as an example of a case in which the other vehicle V2 which is the source of a transmission is located on the front side of the host vehicle V1, a situation is shown in FIG. 14 in which the other vehicle V2 which is the source of a transmission crosses in front of the host vehicle V1, for example, at an intersection that is not controlled by traffic lights.

Figure 13:
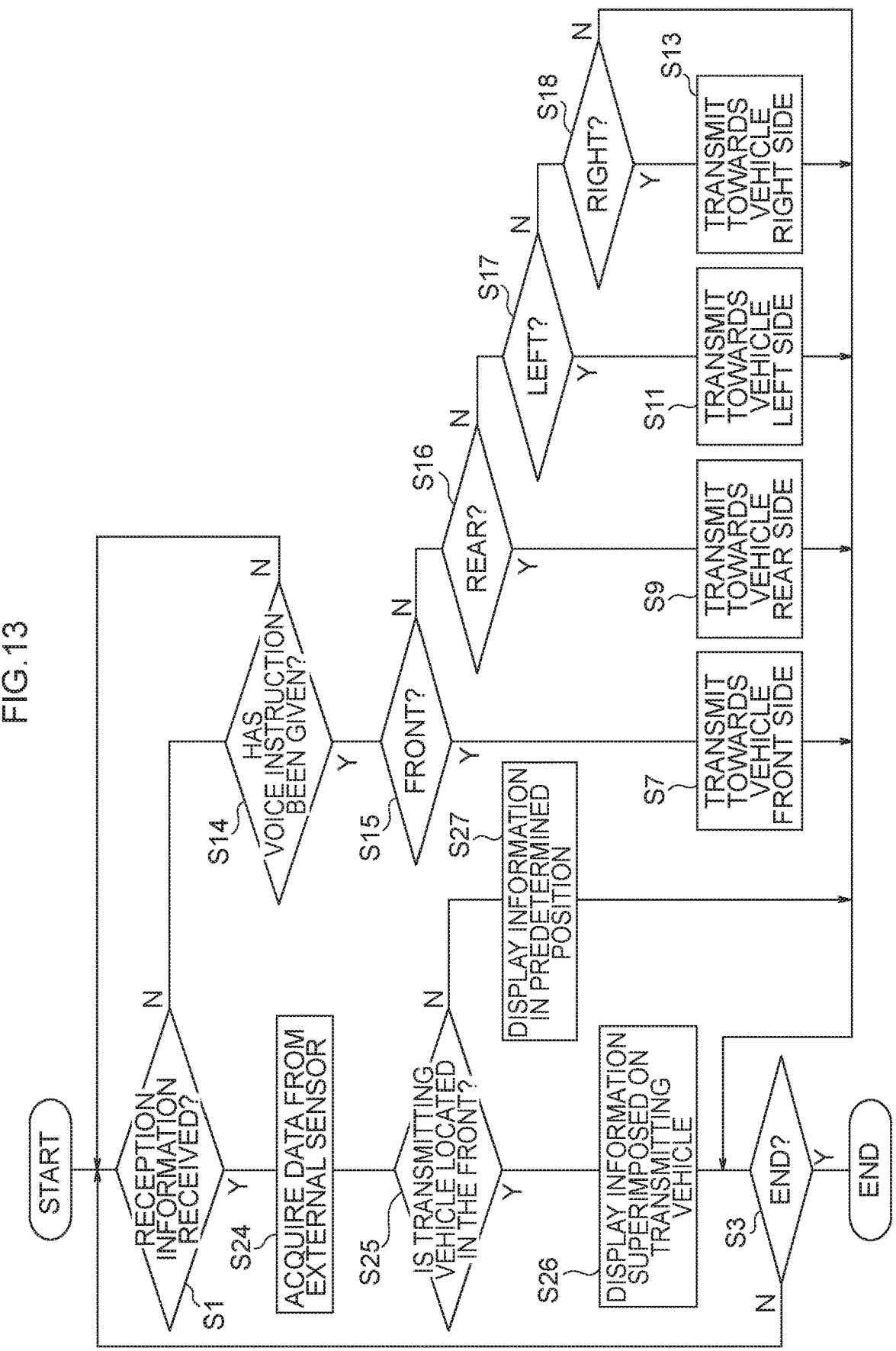
FIG. 13 is a flowchart showing a flow of processing executed by a control device of the vehicle on-board communication device according to the fourth exemplary embodiment.

Next, communication control processing executed by the control device 18 according to the present exemplary embodiment will be described with reference to a flowchart shown in FIG. 13. In this exemplary embodiment, if the determination by the control device 18 in step S1 is affirmative, the routine moves to step S24, while if the determination in step S1 is negative, the routine moves to step S14. If the routine moves to step S14, then the same type of processing is performed as in the second exemplary embodiment.

If, however, the routine moves to step S24, in other words, if the control device 18 determines that the communication unit 12 has received the reception information, the external situation recognition unit 96 of the control device 18 acquires image data for the front side of the host vehicle V1 using the external sensor 92. When the processing of this step S24 is completed, the routine moves to step S25.

In step S25, the external situation recognition unit 96 determines whether or not another vehicle V2 that matches the transmitting vehicle information contained in the reception information received by the communication unit 12 is located on the front side of the host vehicle V1. If this determination is affirmative, the routine moves to step S26, while if the determination is negative, the routine moves to step S27.

In step S26, the notification control unit 22 displays the intention information contained in the reception information received by the communication unit 12 on the transparent display 48C (i.e., on the windshield portion WS). In this case, the notification control unit 22 recognizes the position of the other vehicle V2 based on an output from the external situation recognition unit 96. In addition, the notification control unit 22 displays the received intention information on the transparent display 48C such that it appears either superimposed on or adjacent to the other vehicle V2 when viewed from the perspective of the driver of the host vehicle V1 (see FIG. 14).

Note that, in FIG. 14, an example in which intention information showing 'Thank you' received by the communication unit 12 is displayed so as to appear superimposed on the other vehicle V2 from the perspective of the driver of the host vehicle V1, however, the present disclosure is not limited to this. In other words, it is also possible to employ a structure in which received intention information is displayed adjacently to and either above, below, to the left, or to the right of the other vehicle V2 from the perspective of the driver of the host vehicle V1. Moreover, in the present exemplary embodiment, as is described above, as a result of the notification unit 26 displaying the intention information such that "it is either superimposed on or adjacent to the other vehicle" on the transparent display 48C, a structure in which the occupant of the host vehicle V1 is notified about the transmission source of the transmitting vehicle information, namely, of the intention information is created.

If, however, the routine moves to step S27, in other words, if it is determined that another vehicle V2 that matches the transmitting vehicle information contained in the reception information received by the communication unit 12 is not located on the front side of the host vehicle V1, the notification control unit 22 displays the received intention information showing 'Thank you' at a predetermined position (for example, at a previously set position in front of the driver) on the windshield portion WS. Once the processing of step S27 has been completed, the routine moves to step S3.

In this exemplary embodiment, structure other than that described above is the same as in the first exemplary embodiment. Therefore, in this exemplary embodiment as well, intentions of vehicle occupants can be transmitted between the host vehicle V1 and other vehicles V2 irrespective of the vehicle running state and the weather conditions. Moreover, in this exemplary embodiment, because intention information received by the communication unit 12 is displayed on the windshield portion WS such that it appears either superimposed on or adjacent to the other vehicle V2 when viewed from the perspective of the driver of the host vehicle V1, an occupant of the host vehicle V1 is able to easily confirm the source of an intention information transmission.

Fifth Exemplary Embodiment

Figure 15:
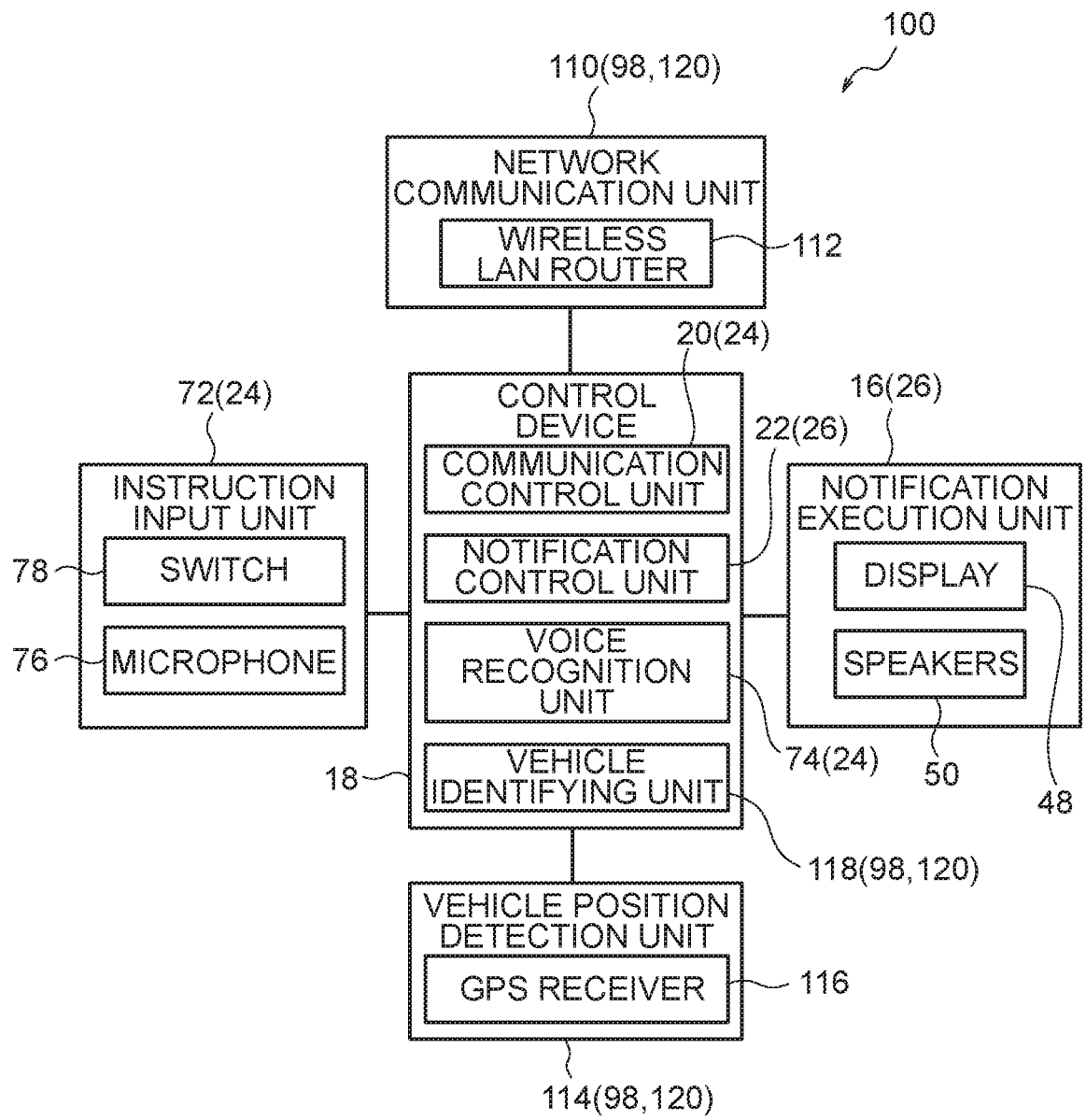
FIG. 15 is a block diagram showing the schematic structure of a vehicle on-board communication device according to a fifth exemplary embodiment of the present disclosure.

FIG. 15 is a block diagram showing the schematic structure of a vehicle on-board communication device 100 according to a fifth exemplary embodiment of the present disclosure. In this exemplary embodiment, a vehicle on-board communication device 100 is installed in each of the host vehicle V1 and the other vehicles V2. Instead of the communication unit 12 of the first exemplary embodiment, this vehicle on-board communication device 100 is provided with a network communication unit 110 that serves as a communication unit. Additionally, a vehicle position detecting unit 114 is also provided in this exemplary embodiment. The network communication unit 110 and the vehicle position detecting unit 114 are connected to the I/O 60 of the control device 18, and the control device 18 includes a vehicle identifying unit 118. The network communication unit 110, the vehicle position detecting unit 114, and the vehicle identifying unit 118 form the transmission source detecting unit 98 and a vehicle detecting unit 120. The transmission source detecting unit 98 is formed so as to detect the position of another vehicle V2 that is the source of an intention information transmission received by the network communication unit 110. The vehicle detecting unit 120 is formed so as to detect another vehicle V2 that is located adjacently to the host vehicle V1, and that has also been specified by an occupant of the host vehicle V1 as being the destination for an intention information transmission. This will now be described more specifically.

The network communication unit 110 includes a wireless LAN router 112, and the control device 18 is connected to an IP (Internet Protocol) network via this wireless LAN router 112. As a result, the control device 18 is connected via this IP network to a server of a vehicle information processing center that is capable of communicating with the host vehicle V1 and other vehicles V2. Note that the network communication unit 110 may also communicate with an external server such as the Cloud or the like via a network such as a mobile telephone communication network or the like.

The vehicle position detecting unit 114 includes a GPS receiver 116. The GPS receiver 116 establishes the position (for example, the latitude and longitude of the host vehicle V1) of the host vehicle V1 by receiving signals from three or more GPS satellites. A structure is employed in which information relating to the position and direction of travel (hereinafter, referred to as 'positional information') of the host vehicle V1 obtained by the GPS receiver 116 is transmitted by the network communication unit 110 to the server of the vehicle information processing center, and this information is accumulated in this server. Positional information for the other vehicles V2 is also accumulated in this server. Note that it is also possible for another device that is capable of identifying the positions (for example, the latitude and longitude) of the host vehicle V1 and the other vehicles V2 to be used instead of the GPS receiver 116.

When an occupant of the host vehicle V1 has instructed by means of a voice instruction that the instruction unit 24 transmit intention information, and has specified the other vehicle V2 which is the destination of the transmission, the vehicle identifying unit 118 detects (i.e., retrieves) the positional information and the IP address of the specified other vehicle V2 using information accumulated in the server of the vehicle information processing center. More specifically, when, for example, an occupant of the host vehicle V1 inputs a voice instruction to 'transmit "Thank you" to the vehicle diagonally to the front and right', the vehicle identifying unit 118 detects the positional information and the IP address of another vehicle V2 that is located diagonally to the front and right of the host vehicle V1 and that is also at the shortest distance from the host vehicle V1. The communication control unit 220 then controls the network communication unit 110 based on an output from the vehicle identifying unit 118, and transmits transmission information corresponding to the above-described voice instruction to the detected IP address.

Figure 16:
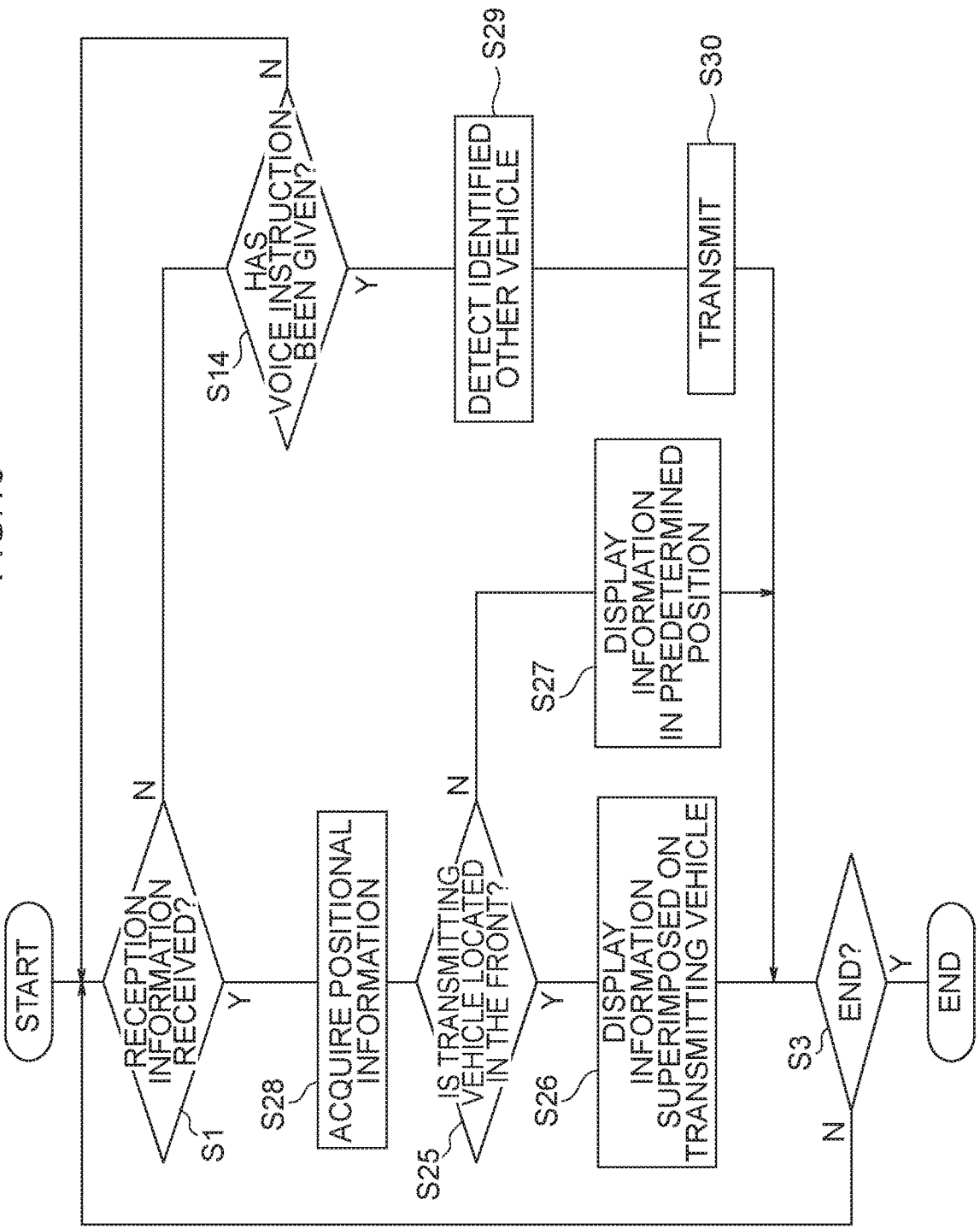
FIG. 16 is a flowchart showing a flow of processing executed by a control device of the vehicle on-board communication device according to the fifth exemplary embodiment.

Next, communication control processing executed by the control device 18 according to the present exemplary embodiment will be described with reference to a flowchart shown in FIG. 16. In this exemplary embodiment, if the determination by the control device 18 in step S1 is negative, the routine moves to step S14, while if the determination in step S1 is affirmative, the routine moves to step S28.

If the routine moves to step S28, in other words, if the control device 18 determines that the network communication unit 110 has received reception information from another vehicle V2, the vehicle identifying unit 118 of the control device 18 acquires positional information for the other vehicle V2 that is the transmission source from the server of the vehicle information processing center via the network communication unit 110. As a result, the vehicle identifying unit 118 recognizes the position of the other vehicle V2 that is the transmission source. Once the processing of step S28 has been completed, the routine moves to step S25. In steps S25 through S27, the same type of processing as that of the fourth exemplary embodiment is executed.

If, however, the determination in step S1 is negative and the routine moves to step S14, then whether or not a voice instruction has been input is determined by the voice recognition unit 74 of the control device 18. If this determination is negative, the routine returns to step S1, while if the determination is positive, the routine moves to step S29.

In step S29, the other vehicle V2 which the occupant of the host vehicle V1 has specified as the transmission destination of the transmission information is detected by the vehicle detecting unit 120. More specifically, the vehicle identifying unit 118 of the vehicle detecting unit 120 detects the positional information and IP address of the other vehicle V2 specified as the transmission destination using information provided by the server of the vehicle information processing center. Once the processing of this step S29 has been completed, the routine moves to step S30.

In step S30, the communication control unit 20 of the control device 18 controls the network communication unit 110 based on outputs from the voice recognition unit 74 and the vehicle identifying unit 118, and transmits intention information (i.e., transmission information) corresponding to the voice instruction to the IP address of the aforementioned detected other vehicle V2. As a result, a structure is created in which transmission information corresponding to the voice instruction is transmitted exclusively to the aforementioned detected other vehicle V2. Additionally, an occupant of the other vehicle V2 is notified by the notification unit 26 of the other vehicle V2 about the transmission information transmitted to the other vehicle V2.

In this exemplary embodiment, structure other than that described above is the same as in the first exemplary embodiment. Therefore, in this exemplary embodiment as well, in the same way as in the first exemplary embodiment, intentions of vehicle occupants can be transmitted between the host vehicle V1 and other vehicles V2 irrespective of the vehicle running state and the weather conditions. Additionally, in this exemplary embodiment, because the same type of processing as that of the fourth exemplary embodiment is performed in steps S25 through S27, fundamentally, the same type of actions and effects are obtained as those of the fourth exemplary embodiment. Furthermore, in this exemplary embodiment, because intention information is transmitted exclusively to the other vehicle V2 that an occupant of the host vehicle V1 has specified to the instruction unit 24 as being the destination of the intention information transmission, it is possible to prevent intention information from being transmitted to a different other vehicle V2 from that intended by the occupant of the host vehicle V1.

Sixth Exemplary Embodiment

Figure 17:
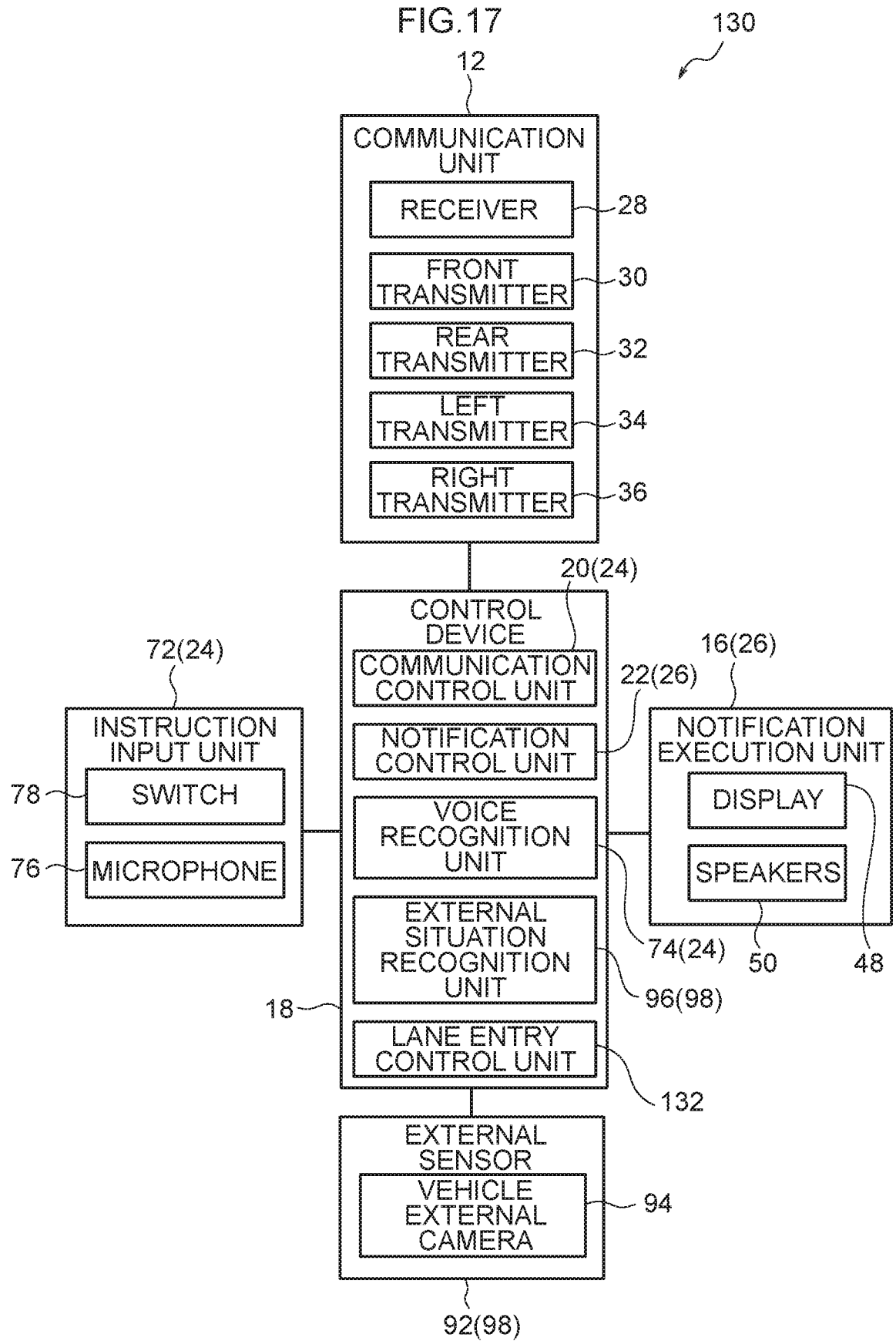
FIG. 17 is a block diagram showing the schematic structure of a vehicle on-board communication device according to a sixth exemplary embodiment of the present disclosure.

FIG. 17 is a block diagram showing the schematic structure of a vehicle on-board communication device 130 according to a sixth exemplary embodiment of the present disclosure. In this exemplary embodiment, a vehicle on-board communication device 130 is installed in each of the host vehicle V1 and the other vehicles V2 (see the other vehicles V21-V25 shown in FIG. 20 and FIG. 21). This vehicle on-board communication device 130 has fundamentally the same structure as the vehicle on-board communication device 90 according to the fourth exemplary embodiment, however, the control device 18 is further provided with a lane entry control unit 132.

The lane entry control unit 132 is formed so that, when the host vehicle V1 wishes to make a lane entry by moving in front of a given vehicle V2 among plural other vehicles V2 traveling in a line in the same traffic lane, the lane entry control unit 132 detects whether or not permission to perform the lane entry has been given by any occupants of the plural other vehicles V2 using intention information received by the communication unit 12. Additionally, the notification unit 26 of the vehicle on-board communication device 130 is formed so as to notify the occupant of the host vehicle V1 that the above-described permission from another vehicle V2 has been detected by the lane entry control unit 132. Note that, in FIG. 20 and FIG. 21, a situation in which the host vehicle V1 coming from an acceleration lane AL of an expressway or the like merges with traffic traveling on the main road MR thereof is shown.

Figure 18:
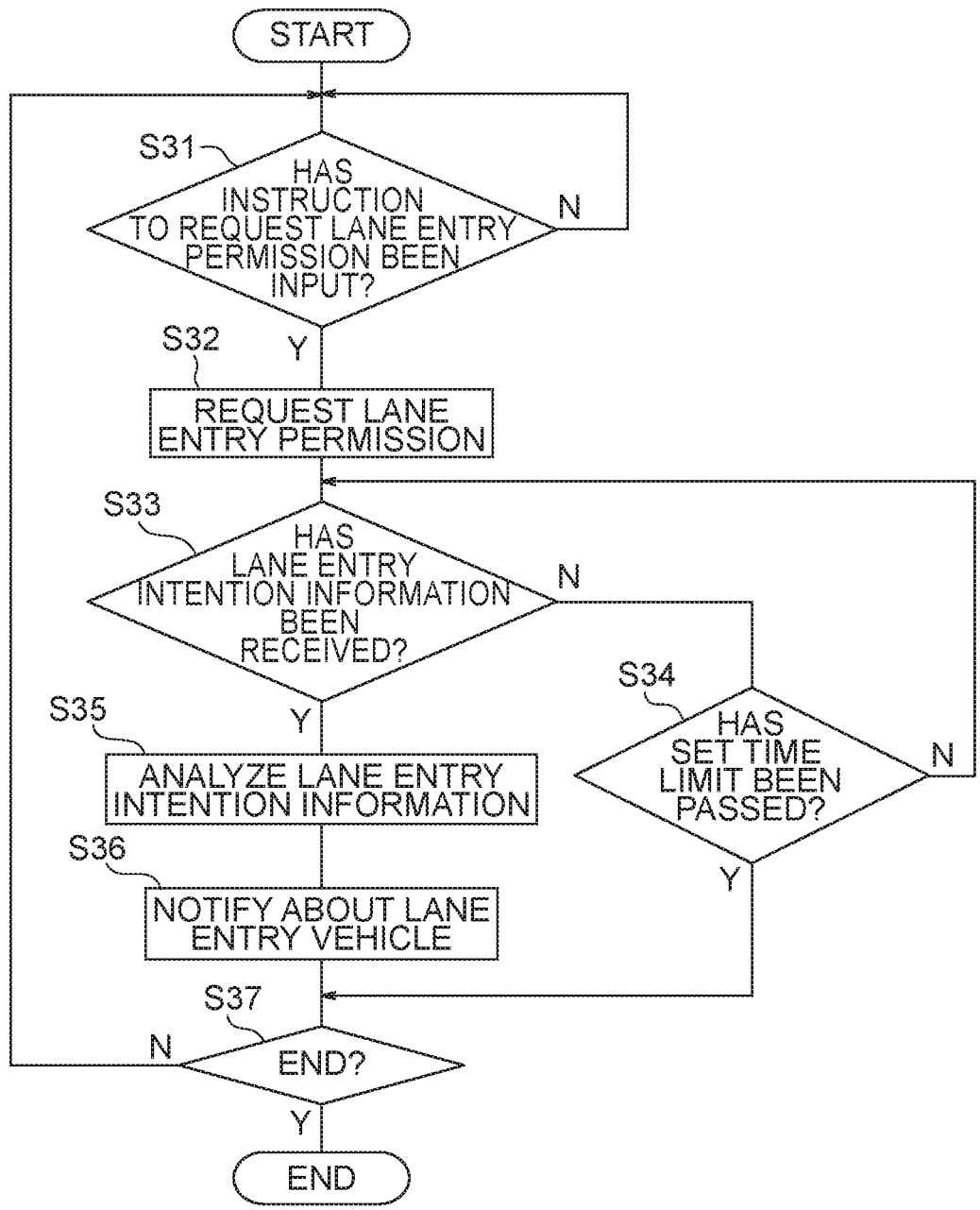
FIG. 18 is a flowchart showing a flow of processing executed by a control device of a vehicle on-board communication device mounted in a vehicle (i.e., a host vehicle) according to the sixth exemplary embodiment.
Figure 19:
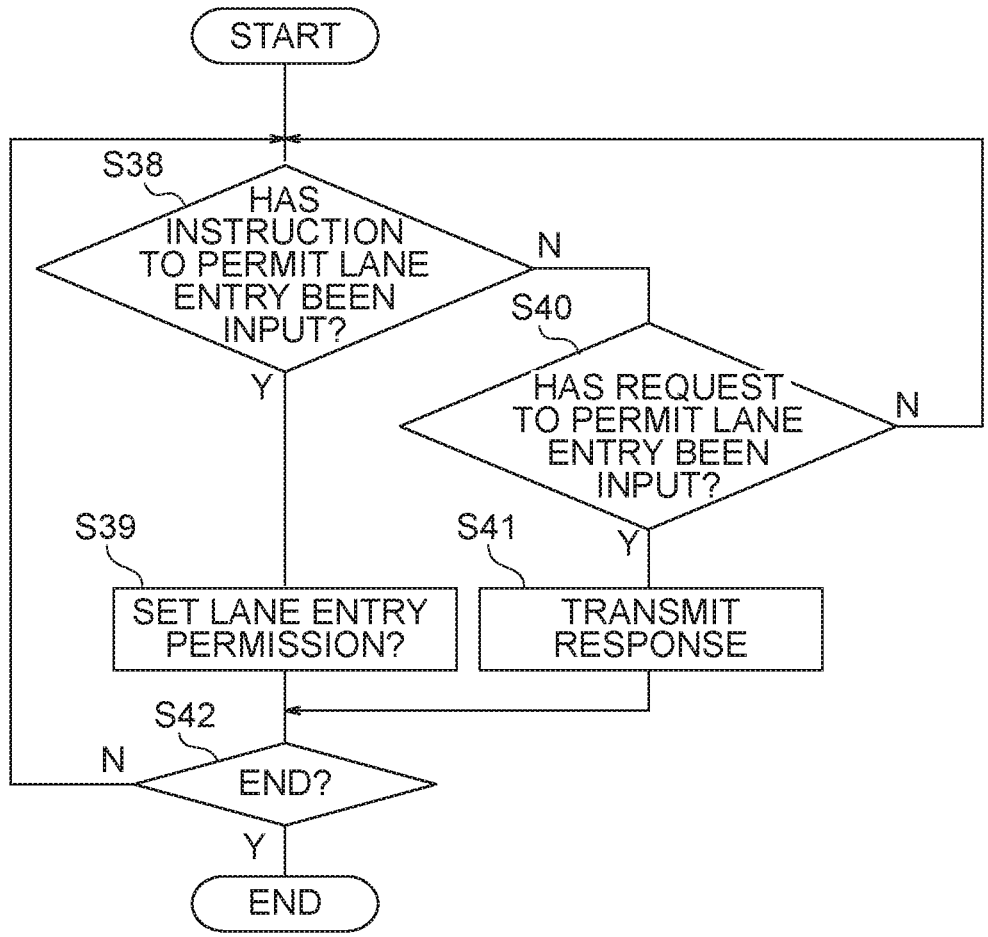
FIG. 19 is a flowchart showing a flow of processing executed by the control device of the vehicle on-board communication device which has been mounted in another vehicle according to the sixth exemplary embodiment.

Next, communication control processing (i.e., lane entry control processing) executed by the control device 18 according to the present exemplary embodiment will be described with reference to flowcharts shown in FIG. 18 and FIG. 19. In FIG. 18, a processing flow when a lane entry permission request is transmitted from the host vehicle V1 to the other vehicles V2 is shown in a flowchart, while in FIG. 19 a processing flow when responses are received from plural other vehicles V2 to the host vehicle V1 that requested the lane entry permission is shown in a flowchart. Firstly, the processing on the host vehicle V1 side will be described based on FIG. 18. Thereafter, the processing on the other vehicle V2 side will be described based on FIG. 19.

As is shown in FIG. 18, in the control device 18 of the host vehicle V1, when, for example, the ignition switch of the host vehicle V1 is turned on, firstly, the processing of step S31 is executed. In step S31, whether or not an instruction to request lane entry permission has been received from an occupant of the host vehicle V1 is determined by the lane entry control unit 132. More specifically, whether or not a voice instruction (for example, a voice instruction such as 'Request lane entry permission') that has been previously set in the lane entry control unit 132 has been input by an occupant of the host vehicle V1 is determined by the lane entry control unit 132. The processing of this step S31 is repeated until the determination in step S31 is affirmative. When the determination in step S31 is affirmative, the routine moves to the next step S32.

Figure 20:
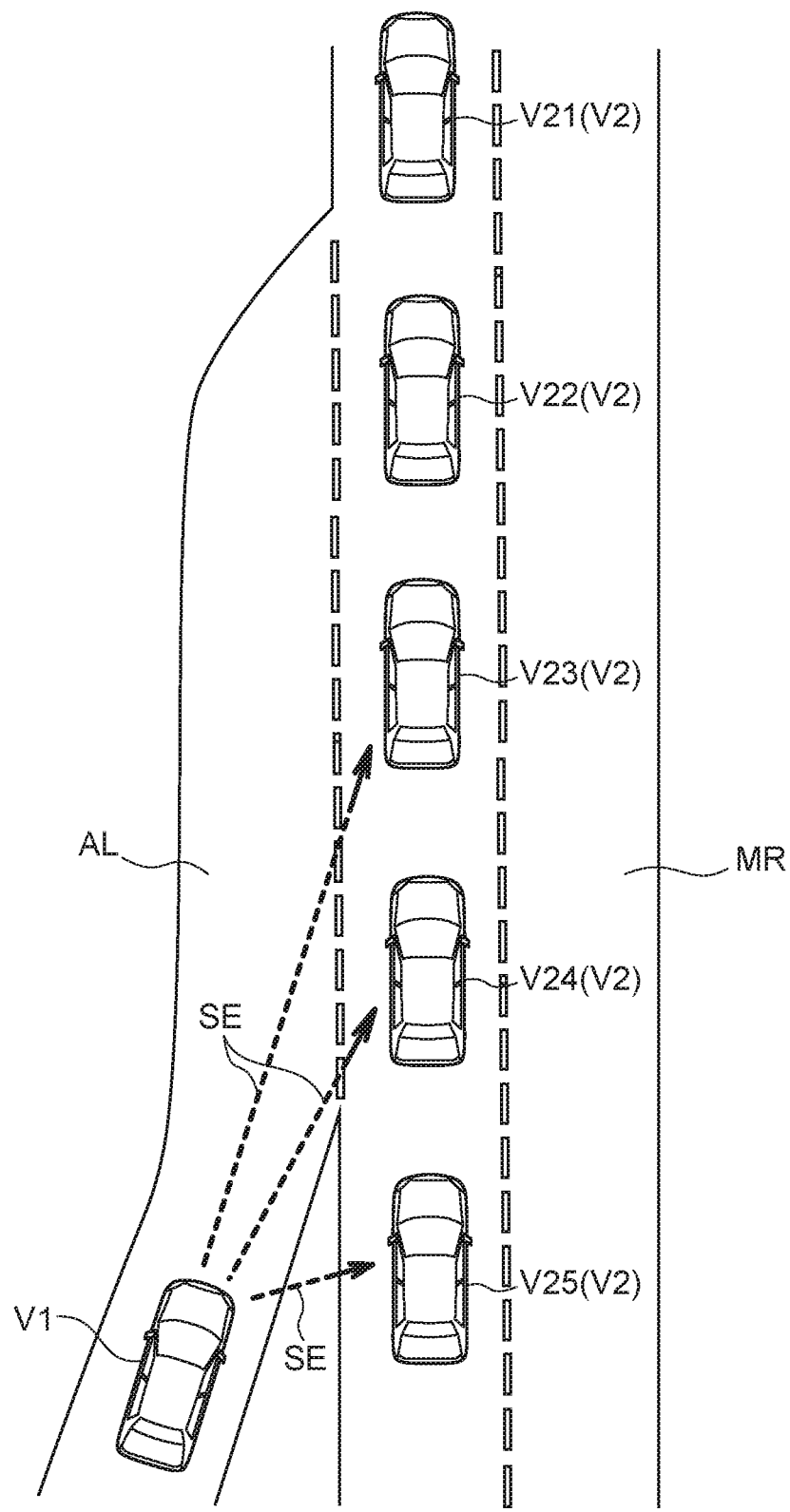
FIG. 20 is a plan view showing a situation in which a lane entry permission request is transmitted by a host vehicle when that host vehicle wishes to enter a lane in front of a particular other vehicle from among plural other vehicles traveling in a line in the same traffic lane.
Figure 21:
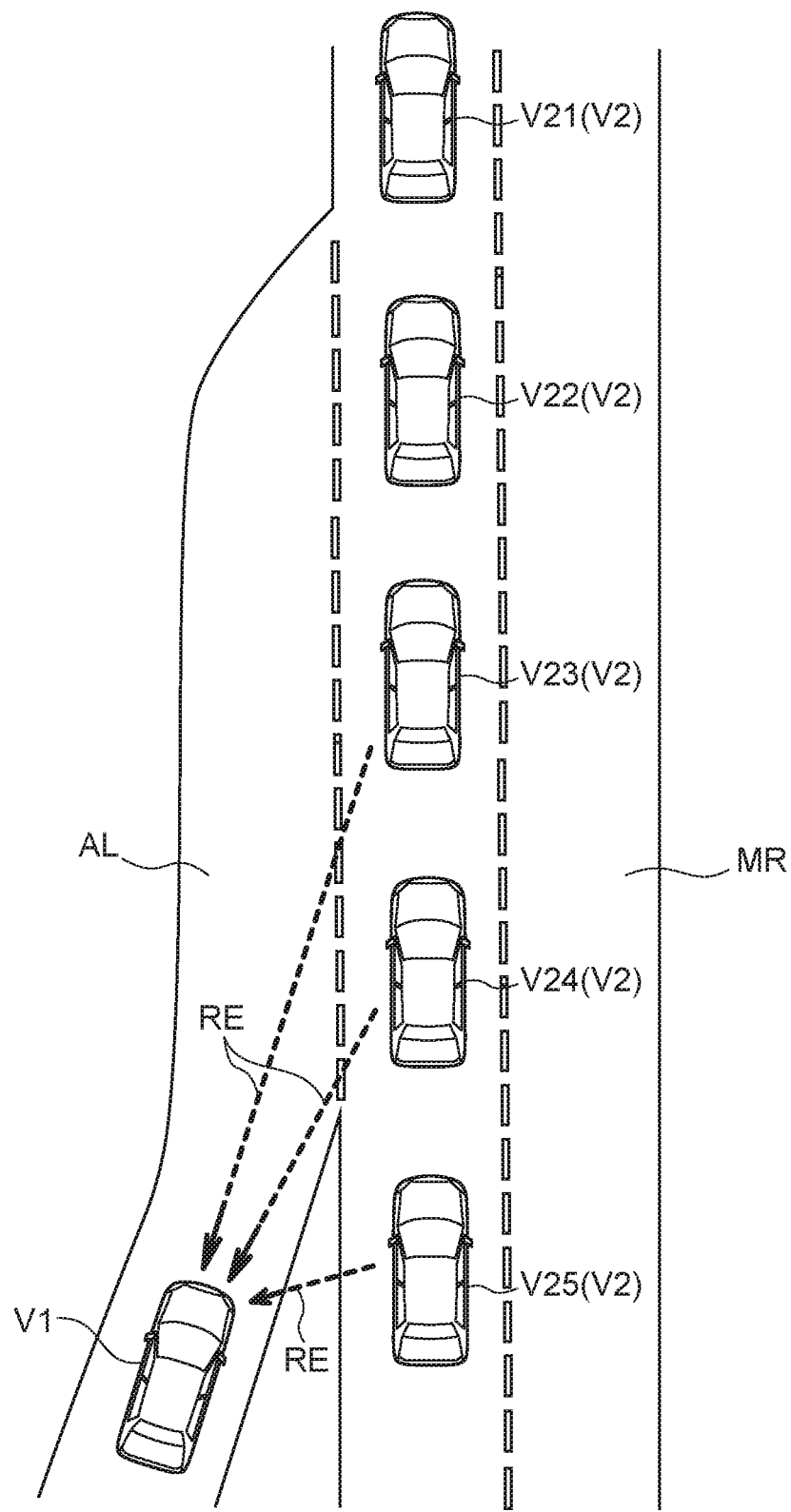
FIG. 21 is a plan view showing a situation in which responses are sent from plural other vehicles to the host vehicle which is requesting the lane entry permission.

In step S32, the communication control unit 20 controls the communication unit 12 based on an output from the lane entry control unit 132. Namely, the communication control unit 20 causes the communication unit 12 to transmit lane entry request information (i.e., information that is used to request lane entry permission) that has been set in advance in the lane entry control unit 132. Transmitting vehicle information is included in this lane entry request information. Note that, in this case, in the present exemplary embodiment, as is shown in FIG. 20 and FIG. 21, because the main road MR is for driving on the left side of the road, the communication control unit 20 only operates, for example, the front transmitter 30, the rear transmitter 32, and the right transmitter 36 so that the lane entry request information is only transmitted to the vehicle front side, the vehicle rear side, and the vehicle right side. Furthermore, in this case, the communication control unit 20 also controls the front transmitter 30, the rear transmitter 32, and the right transmitter 36 (see arrows SE in FIG. 20) so that the lane entry request information is only transmitted within a previously set range (for example, within a range extending for several tens of meters from the host vehicle V1 towards the vehicle front side, the vehicle rear side, and the vehicle right side). Note that, in the example shown in FIG. 20, a situation in which lane entry request information is transmitted within a range that encompasses the other vehicles V23, V24, and V25 is shown by the arrows SE. Once the processing of step S32 has been completed, the routine moves to step S33.

In step S33, the lane entry control unit 132 determines whether or not the communication unit 12 has received lane entry intention information from the other vehicles V2. This lane entry intention information is information showing whether or not occupants of the plural other vehicles V2 have given their permission to make the lane entry, and this information is transmitted from the plural other vehicles V2. Transmitting vehicle information is included in this lane entry intention information. This lane entry intention information will be described again in the description of the processing performed on the other vehicle V2 side shown in FIG. 19. If the determination in step S33 is affirmative, the routine moves to step S35, while if the determination in step S33 is negative, the routine moves to step S34.

In step S34, whether or not a previously set time limit (for example, 5 seconds) has passed since the lane entry request information was transmitted is determined by the lane entry control unit 132. If the determination in step S34 is negative, the routine returns to the above-described step S33, while if the determination is affirmative, the routine moves to step S37.

If, however, the determination in step S33 is affirmative so that the routine has moved to step S35, the lane entry control unit 132 analyzes the lane entry intention information received by the communication unit 12 and detects whether or not permission to make a lane entry has been given by the occupants of the plural other vehicles V2. Additionally, in this case, the lane entry control unit 132 selects another vehicle V2 that the lane entry control unit 132 has detected has given permission for the lane change to be made (hereinafter, referred to as the 'permitting vehicle V2), and detects the position of this permitting vehicle V2 based on an output from the external situation recognition unit 96. More specifically, the external situation recognition unit 96 compares the situation in front of the host vehicle V1, which it has recognized based on an output from the external sensor 92, with the transmitting vehicle information contained in lane entry permission information, and detects the position of the permitting vehicle V2 relative to the host vehicle V1. The result of this detection is then output from the external situation recognition unit 96 to the lane entry control unit 132. Once the processing of this step S35 has been completed, the routine moves to step S36.

In step S36, the notification control unit 22 controls the notification execution unit 16 based on an output from the lane entry control unit 132, and notifies the vehicle occupant of the host vehicle V1 about the permitting vehicle V2. More specifically, the notification control unit 22 controls, for example, the transparent display 48C so as to cause textual information or graphic information to be displayed on the transparent display 48C (for example, the windshield portion WS) in order to notify the vehicle occupant of the host vehicle V1 about the permitting vehicle V2. As an example of this, a case is shown in FIG. 22 in which, when the permitting vehicle V2 is the other vehicle V24, a graphic SH of an arrow pointing to the front of the other vehicle V24 (i.e., the permitting vehicle) as seen from the driver's perspective is displayed on the windshield portion WS. This graphic SH is a guidance display that guides the host vehicle V1 to the front of the permitting vehicle V24. Note that the display that is used to notify the occupant of the host vehicle V1 about the permitting vehicle V24 is not limited to being the graphic SH of an arrow, such as is described above. For example, it is also possible to notify the driver of the host vehicle V1 about the permitting vehicle V24 by displaying an identifying color or text message on an area of the windshield portion WS where it appears superimposed on the permitting vehicle V24 as seen from the driver's perspective. Once the processing of step S36 has ended, the routine moves to step S37.

In step S37, the control device 18 determines whether or not the driving of the host vehicle V1 has ended based, for example, on whether or not the ignition switch of the host vehicle V1 has been turned off. If this determination is negative, the routine returns to the above-described step S31, while if the determination is affirmative, the communication control processing shown in FIG. 18 is ended.

Next, the processing performed on the other vehicle V2 side will be described based on FIG. 19. As is shown in FIG. 19, in the control device 18 of the other vehicle V2, when, for example, the ignition switch of the other vehicle V2 is turned on, firstly, the processing of step S38 is executed. In step S38, whether or not an instruction to set the lane entry permission has been received from an occupant of the other vehicle V2 is determined by the lane entry control unit 132. More specifically, whether or not a voice instruction (for example, a voice instruction such as 'set YES for lane entry permission', or 'set NO for lane entry permission') corresponding to the lane entry intention information that has been previously set in the lane entry control unit 132 has been input by an occupant of the other vehicle V2 is determined by the lane entry control unit 132. If the determination of step S38 is negative, the routine moves to step S40, while if the determination in step S38 is affirmative, the routine moves to step S39.

In step S39, the lane entry control unit 132 sets the lane entry intention information to 'YES' (i.e., permitted) or 'NO' (i.e., not permitted), based on the voice instruction input by the vehicle occupant of the other vehicle V2. Once the processing of step S39 has been completed, the routine moves to step S42.

In step S42, the control device 18 determines whether or not the driving of the other vehicle V2 has ended based, for example, on whether or not the ignition switch of the other vehicle V2 has been turned off. If this determination is negative, the routine returns to the above-described step S38, while if the determination is affirmative, the communication control processing shown in FIG. 19 is ended.

If, however, the determination in step S38 is negative so that the routine has moved to step S40, the lane entry control unit 132 determines whether or not a lane entry permission request has been made, namely, whether or not the communication unit 12 has received lane entry request information. If this determination is negative, the routine returns to the above-described step S38, while if the determination is affirmative, the routine moves to step S41.

In step S41, the communication control unit 20 controls the communication unit 12 based on an output from the lane entry control unit 132, and causes the communication unit 12 to transmit (i.e., as a response) the lane entry intention information set in step S39. Note that, in the present exemplary embodiment, as is shown in FIG. 20 and FIG. 21, because the main road MR is for driving on the left side of the road, the communication control unit 20 only operates, for example, the front transmitter 30, the rear transmitter 32, and the left transmitter 34 so that the lane entry intention information is only transmitted to the vehicle front side, the vehicle rear side, and the vehicle left side. In this case, the communication control unit 20 also controls the front transmitter 30, the rear transmitter 32, and the left transmitter 34 (see arrows RE in FIG. 21) so that the lane entry request information is only transmitted within a previously set range (for example, within a range extending for several tens of meters from the other vehicle V2 towards the vehicle front side, the vehicle rear side, and the vehicle left side). Once the processing of step S41 has been completed, the routine moves to the above-described step S42.

Note that if the routine moves to steps S40 and S41 without the lane entry intention information having been set in the above-described steps S38 and S39, then the lane entry intention information that was set immediately prior to the previous time the driving of the other vehicle V2 was ended is transmitted in step S41. Moreover, in an initial state in which no lane entry intention information has yet been set, a structure is employed in which information showing that lane entry intention information has not yet been set is transmitted in step S41. Note that it is also possible to employ a structure in which the control device 18 sends notification to (i.e., encourages) a vehicle occupant to set lane entry intention information via the display 48 or the like.

Moreover, in the present exemplary embodiment, a vehicle on-board communication device 130 is installed in each one of plural other vehicles V2, however, if vehicle on-board communication devices 130 are not installed in any of or in a portion of the plural other vehicles V2, then lane entry intention information is not transmitted (i.e., as a response) from either all of or the portion of the plural other vehicles V2. For example, if lane entry intention information is not transmitted (i.e., as a response) from any of the plural other vehicles V2, then because the routine moves to step S37 shown in FIG. 18 as a result of the set time limit of step S34 shown in FIG. 18 having been passed, the notification about the permitting vehicle of step S36 shown in FIG. 18 is not given.

In this exemplary embodiment, structure other than that described above is the same as in the fourth exemplary embodiment. Therefore, in this exemplary embodiment as well, in the same way as in the fourth exemplary embodiment, intentions of vehicle occupants can be transmitted between the host vehicle V1 and other vehicles V2 irrespective of the vehicle running state and the weather conditions. Moreover, in this exemplary embodiment, when the host vehicle V1 wishes to make a lane entry by moving in front of a given vehicle V2 among plural other vehicles V2 traveling in a line in the same traffic lane, the lane entry control unit 132 detects whether or not permission to perform the lane entry has been given by any occupants of the plural other vehicles V2 using intention information (i.e., lane entry intention information) received by the communication unit 12. Additionally, the notification unit 26 notifies the occupant of the host vehicle V1 that the above-described permission from another vehicle V2 has been detected by the lane entry control unit 132. As a consequence, it is possible to prevent or reduce any trouble arising from a lane entry.

[Supplementary Description of the Exemplary Embodiments]

In the above-described sixth exemplary embodiment, a structure is employed in which the lane entry control unit 132 detects whether or not permission to make a lane entry has been given by any of the vehicle occupants of plural other vehicles V2 using intention information (i.e., lane entry intention information) received by the communication unit 12, however, as an alternative technological concept to this, it is also possible to employ a structure in which intention information is not used. In other words, it is possible to employ a structure in which, by using driving tendency information, which is information such as, for example, the pulse rate of the drivers, the number of times they have given lane entry permission, and their past running speed (i.e., how carefully they drive), an occupant of the host vehicle is notified as to which other vehicles exhibit a strong tendency towards permitting lane entries.

In this case, the present disclosure relates to a vehicle on-board communication device (i.e., a communication device for lane entries) provided with a driving intention storage unit that detects a driving tendency of a driver of a host vehicle, and stores a result of this detection as driving tendency information, a communication unit that transmits and receives the driving tendency information via wireless communication between the host vehicle and other vehicles located in the vicinity thereof, a lane entry control unit that, when a host vehicle wishes to make a lane entry by moving in front of a given vehicle among plural other vehicles traveling in a line in the same traffic lane, determines respective degrees of tolerance towards a lane entry request by occupants of the plural other vehicles using the driving tendency information received by the communication unit, and a notification unit that notifies the occupant of the host vehicle about other vehicles that have been determined by the lane entry control unit to have a high degree of tolerance towards a lane entry request. In this communication device for lane entries, it is possible to solve the problem of 'preventing or reducing any trouble arising from a lane entry.'

Note that whether or not the above described degree of tolerance is high can be determined, for example, by whether or not the driving tendency information received by the communication unit is equal to or below a threshold value that has been set in advance in the lane entry control unit. Additionally, the above-described driving tendency storage unit includes, for example, at least one of a pulse rate sensor that detects the driver's pulse rate, a lane entry sensor that counts the number of times the host vehicle has permitted lane entries, and a running state sensor that detects various types of physical quantities while the host vehicle is running. Additionally, this running state sensor includes at least one of a vehicle speed sensor, an acceleration sensor, and a yaw rate sensor. Furthermore, in the above-described communication device for lane entries, it is also possible to employ a structure in which driving tendency information is transmitted and received based, for example, on communication results from road-to-vehicle communication irrespective of any instructions given by a vehicle occupant. In other words, it is also possible to employ a structure in which the communication unit communicates with infrastructure (for example, optical beacons or the like) provided along the roadside, and to transmit and receive driving tendency information automatically at expressway on-ramps and the like.

In cases in which, for example, the control device 18 of the above-described respective exemplary embodiments has artificial intelligence, then it is also possible for the animated characters (see the graphic information GI in FIG. 3) displayed on the display 48 of the transparent display 48C and the like to gradually develop in accordance with the likes and preferences of the vehicle occupant of the host vehicle V1. By enabling such an animated character to converse with the occupant of the host vehicle V1, or to provide that vehicle occupant with information, the attachment of the vehicle occupant to their vehicle (i.e., to the host vehicle V1) can be deepened. It is also possible for this animated character to move, for example, to various locations on the windshield portion WS so as to guide the line of sight of the vehicle occupant in a particular direction. Moreover, the occupant of the host vehicle V1 may be allowed to choose an optional character from among multiple characters. It is also possible for such an animated character to be transmitted from the host vehicle V1 to another vehicle V2 as intention information of the occupant of the host vehicle V1, and consequently displayed on a display unit (for example, the transparent display 48C or the like) of the other vehicle V2. In this case, for example, the animated character displayed on the display unit of the other vehicle V2 may convey an intention of the occupant of the host vehicle V1 to the occupant of the other vehicle V2 by performing an action or the like. Additionally, it is also possible, for example, at the same time as the animated character is being displayed on the display unit of the other vehicle V2 for intention information to be output as audio information from the speakers 50 of the other vehicle V2.

It is also possible for the notification execution unit 16 according to each of the above-described exemplary embodiments, and the network communication unit 110 according to the above-described fifth exemplary embodiment to be formed by a mobile terminal (such as a smart phone or a tablet device) that is portable outside the host vehicle V1. In this case, a structure is employed in which this mobile terminal is connected to the control device 18 either by wires or wirelessly.

Furthermore, in each of the above-described exemplary embodiments, a description is given of when the processing performed by the control device 18 is software processing that is performed as a result of a program being executed, however, the present disclosure is not limited to this, and it is also possible for this processing to be performed by hardware. Alternatively, the processing may be performed via a combination of both software and hardware. The program that is stored in the ROM 56 may also be stored on a variety of storage media and distributed.

In addition to those described above, various other modifications and the like may be made to the present disclosure insofar as they do not depart from the spirit or scope of the present disclosure. Additionally, it is to be understood that the scope of rights of the present disclosure is not limited to the above-described respective exemplary embodiments.

What is claimed is:

1. A vehicle on-board communication device, comprising:
a communication unit that transmits and receives, via wireless communication between a host vehicle and other vehicles located in the vicinity thereof, intention information relating to an intention of a vehicle occupant;
an instruction unit that receives transmission instructions from an occupant of the host vehicle and causes the intention information to be transmitted to the communication unit;
a transmission source detecting unit that detects a position of another vehicle that is a transmission source of the intention information received by the communication unit and determines whether the another vehicle is located in front of the host vehicle based on the position of the another vehicle; and
a notification unit that notifies the occupant of the host vehicle about the intention information of an occupant of another vehicle received by the communication unit,
wherein the notification unit comprises a display unit that displays the intention information of the occupant of another vehicle that has been received by the communication unit on a windshield portion of the host vehicle;
wherein, in response to determining that the another vehicle detected by the transmission source detecting unit is located in front of the host vehicle, the display unit displays, on the windshield portion, the received intention information such that, when viewed from a perspective of a driver of the host vehicle, a simulation of the intention information received from the another vehicle appears either superimposed on or adjacent to a real object of the another vehicle on the windshield;
wherein the instruction unit receives directional information from the occupant of the host vehicle; and
wherein the communication unit is configured to:
select one of a front transmitter, a rear transmitter, a left transmitter, and a right transmitter based on the directional information; and
transmit radio waves including the intention information of the occupant of the host vehicle only through the selected transmitter.

2. The vehicle on-board communication device according to claim 1, wherein:
together with the intention information, the communication unit also transmits and receives transmitting vehicle information that indicates a transmission source of the intention information, and
the notification unit notifies the occupant of the host vehicle of the transmitting vehicle information received by the communication unit together with the intention information.

3. The vehicle on-board communication device according to claim 1, further comprising a lane entry control unit that, when the host vehicle wishes to perform a lane entry by moving in front of a given vehicle among a plurality of other vehicles traveling in a line in the same traffic lane, detects whether or not permission to perform the lane entry has been given by an occupant of the given vehicle, using the intention information received by the communication unit,
wherein the notification unit notifies the occupant of the host vehicle of the given vehicle from which the permission has been detected by the lane entry control unit.

4. The vehicle on-board communication device according to claim 1, wherein an instruction to select one item of the intention information, from a plurality of types of the intention information stored in the instruction unit, for transmission to the communication unit, is contained in the transmission instructions.

5. The vehicle on-board communication device according to claim 1, wherein the display unit displays the intention information of the occupant of another vehicle that has been received by the communication unit on an instrument panel portion of the host vehicle.

6. The vehicle on-board communication device according to claim 1, wherein:
the instruction unit comprises a vehicle detecting unit that detects another vehicle that is both located adjacently to the host vehicle and that an occupant of the host vehicle has specified as a transmission destination of the intention information, and the communication unit transmits the intention information exclusively to the other vehicle detected by the vehicle detecting unit.

7. The vehicle on-board communication device according to claim 1, wherein:

an instruction as to a transmission direction of the intention information is contained in the transmission instructions, and the communication unit transmits the intention information in the transmission direction instructed with respect to the instruction unit.

8. The vehicle on-board communication device according to claim 1, wherein the instruction unit comprises a voice acquisition unit that acquires a voice input of an occupant of the host vehicle, and receives the transmission instructions via the voice input.

9. The vehicle on-board communication device according to claim 1, wherein the instruction unit comprises an image capture unit that captures images of a driver of the host vehicle, and receives the transmission instructions via a gesture made by the driver.

10. The vehicle on-board communication device according to claim 1, wherein the instruction unit comprises an operating unit that is operated by an occupant of the host vehicle, and receives the transmission instructions via this operation.

11. The vehicle on-board communication device according to claim 1, wherein:

an instruction to select one item of the intention information from a plurality of types of the intention information stored in the instruction unit, for transmission to the communication unit, is contained in the transmission instructions, and the plurality of types of the intention information comprise textual information and graphic information.

12. The vehicle on-board communication device according to claim 4, wherein the display unit displays the selected one item of the intention information on at least one of the windshield portion of the host vehicle or an instrument panel portion of the host vehicle.

13. The vehicle on-board communication device according to claim 3, wherein the display unit displays, on the windshield portion, a guidance display that guides the host vehicle toward the front of the given vehicle from which the lane entry permission has been detected.

14. The vehicle on-board communication device according to claim 3, wherein the display unit displays an identifying color or text message on an area of the windshield portion at which it appears superimposed on an actual object of the given vehicle from which the lane entry permission has been detected, as seen from a driver's perspective.

15. The vehicle on-board communication device according to claim 2, wherein a type, a model, a color and an automobile registration number of the host vehicle are included in the transmitting vehicle information.

16. The vehicle on-board communication device according to claim 1, wherein the communication unit is configured by a mobile terminal that is portable outside the host vehicle.

17. A vehicle provided with the vehicle on-board communication device according to claim 1.

18. The vehicle on-board communication device according to claim 1, wherein an instruction to select one item of the intention information, from a plurality of types of the intention information stored in the instruction unit, for transmission to the communication unit, is contained in the transmission instructions, and wherein the plurality of types of the intention information includes different types of emotions.

* * * * *